(12) United States Patent
Albertelli

(10) Patent No.: US 9,610,759 B2
(45) Date of Patent: Apr. 4, 2017

(54) COMPOSITE PRODUCT WITH SURFACE EFFECT

(75) Inventor: Aldino Albertelli, London (GB)

(73) Assignee: ACELL INDUSTRIES LIMITED, Cork (IE)

( * ) Notice: Subject to any disclaimer, the term of this patent is extended or adjusted under 35 U.S.C. 154(b) by 0 days.

(21) Appl. No.: 13/125,245

(22) PCT Filed: Oct. 20, 2009

(86) PCT No.: PCT/GB2009/051414
§ 371 (c)(1),
(2), (4) Date: Jul. 11, 2011

(87) PCT Pub. No.: WO2010/046699
PCT Pub. Date: Apr. 29, 2010

(65) Prior Publication Data
US 2011/0262701 A1    Oct. 27, 2011

(30) Foreign Application Priority Data

Oct. 20, 2008  (GB) .................................. 0819212.2
Oct. 20, 2008  (GB) .................................. 0819213.0
(Continued)

(51) Int. Cl.
*B32B 5/16*  (2006.01)
*B32B 5/18*  (2006.01)
(Continued)

(52) U.S. Cl.
CPC .......... *B32B 37/24* (2013.01); *B29C 37/0032* (2013.01); *B29C 43/18* (2013.01);
(Continued)

(58) Field of Classification Search
CPC .. B32B 5/16; B32B 5/18; B32B 5/245; B32B 5/30; B32B 19/02; B32B 19/045;
(Continued)

(56) References Cited

U.S. PATENT DOCUMENTS 4,034,137 A * 7/1977 Hofer ......................... 428/322.7
5,085,424 A * 2/1992 Wood, Jr. ......................... 472/92
(Continued)

FOREIGN PATENT DOCUMENTS

DE         197 36 952       3/1999
DE    10 2005 011 399       9/2006
(Continued)

OTHER PUBLICATIONS

International Search Report for International Application No. PCT/GB2009/051414 mailed Aug. 11, 2010.
(Continued)

*Primary Examiner* — Michael Tolin
(74) *Attorney, Agent, or Firm* — Merchant & Gould P.C.

(57) ABSTRACT

The present invention relates to methods of manufacturing composite products having a surface effect. In some examples described, a composite product has a simulated surface, for example a stone-effect surface formed by pressing a particulate-form surface material (30) and a sheet-form curable material (40) onto a substrate (44) having an open-celled structure. In other examples, a laminate product having a veneer is formed by pressing a veneer and a sheet-form material onto a substrate including a porous structure. The veneer may comprise a wood material. In other examples, a surface effect material is bonded to a skin by pressing a sheet-form curable material to a mold surface and the surface effect material. Where the surface effect material has a high thermal conductivity, the composite product formed can feel cool to the touch.

23 Claims, 10 Drawing Sheets

(30) Foreign Application Priority Data

Oct. 20, 2008 (GB) .................................. 0819214.8
Mar. 23, 2009 (GB) .................................. 0904912.3

(51) Int. Cl.

| | |
|---|---|
| B32B 5/30 | (2006.01) |
| B32B 27/14 | (2006.01) |
| B32B 37/24 | (2006.01) |
| B29C 43/18 | (2006.01) |
| B44F 9/04 | (2006.01) |
| B32B 19/02 | (2006.01) |
| B29C 37/00 | (2006.01) |
| B29C 44/56 | (2006.01) |
| B44C 5/04 | (2006.01) |
| B29C 43/20 | (2006.01) |
| B32B 37/02 | (2006.01) |
| B32B 38/06 | (2006.01) |
| E04F 13/08 | (2006.01) |
| B32B 38/00 | (2006.01) |
| B29K 105/08 | (2006.01) |
| B29K 105/04 | (2006.01) |
| B29K 105/00 | (2006.01) |
| B29L 31/00 | (2006.01) |

(52) U.S. Cl.
CPC .......... *B29C 43/203* (2013.01); *B29C 44/569* (2013.01); *B29C 44/5627* (2013.01); *B32B 5/16* (2013.01); *B32B 5/18* (2013.01); *B32B 5/30* (2013.01); *B32B 19/02* (2013.01); *B32B 27/14* (2013.01); *B32B 37/02* (2013.01); *B32B 38/0012* (2013.01); *B32B 38/06* (2013.01); *B44C 5/0423* (2013.01); *B44C 5/0453* (2013.01); *B44F 9/04* (2013.01); *E04F 13/0871* (2013.01); *E04F 13/0875* (2013.01); *B29C 2037/0039* (2013.01); *B29K 2105/045* (2013.01); *B29K 2105/0854* (2013.01); *B29K 2105/0863* (2013.01); *B29K 2105/256* (2013.01); *B29L 2031/722* (2013.01); *B32B 2037/243* (2013.01); *B32B 2038/002* (2013.01); *B32B 2038/0016* (2013.01); *B32B 2038/0024* (2013.01); *B32B 2260/025* (2013.01); *B32B 2305/022* (2013.01); *B32B 2307/202* (2013.01); *B32B 2307/554* (2013.01); *B32B 2311/00* (2013.01); *B32B 2317/16* (2013.01); *B32B 2318/04* (2013.01); *B32B 2419/00* (2013.01); *B32B 2419/02* (2013.01); *B32B 2419/04* (2013.01); *B32B 2471/00* (2013.01); *B32B 2479/00* (2013.01); *B32B 2607/00* (2013.01); *Y10T 428/24405* (2015.01)

(58) Field of Classification Search
CPC ....... B32B 19/047; B32B 19/06; B32B 27/14; B32B 37/24; B32B 2260/025; B32B 2318/04; B32B 2038/0024; B32B 2607/00; B29C 2037/0039; B29C 37/0032; B29C 43/18; B29C 43/203; B29C 44/5627; B29C 44/569; B29K 2105/045; B29K 2105/06; B29K 2105/0863; B29K 2709/14; B44F 9/04; B44C 5/0423; B44C 5/0438; B44C 5/0453
USPC ........ 156/276, 279, 62.2; 428/147, 143, 150
See application file for complete search history.

(56) References Cited

U.S. PATENT DOCUMENTS

| | | | |
|---|---|---|---|
| 5,142,835 | A | 9/1992 | Mrocca |
| 5,352,158 | A * | 10/1994 | Brodeur, Jr. .................... 472/92 |
| 2008/0008861 | A1 | 1/2008 | Leng |

FOREIGN PATENT DOCUMENTS

| | | |
|---|---|---|
| EP | 1 022 400 | 7/2000 |
| GB | 1 595 078 | 8/1981 |
| GB | 2 338 435 | 12/1999 |
| JP | 60-180823 | 9/1985 |
| JP | 61-229542 | 10/1986 |
| JP | 4-103635 | 4/1992 |
| JP | 11-227104 | 8/1999 |
| WO | WO 99/35364 | 7/1999 |
| WO | WO 99/43466 | 9/1999 |
| WO | WO 03/053672 | 7/2003 |

OTHER PUBLICATIONS

United Kingdom Search Report for Application No. GB0819212.2 mailed Sep. 4, 2009.
United Kingdom Search Report for Application No. GB0904912.3 mailed Sep. 21, 2009.

* cited by examiner

COMPOSITE PRODUCT WITH SURFACE EFFECT

This application is a National Stage Application of PCT/GB2009/051414, filed 20 Oct. 2009, which claims benefit of Serial No. 0819212.2, filed 20 Oct. 2008 in the United Kingdom, Serial No. 0819213.0, filed 20 Oct. 2008 in the United Kingdom, Serial No. 0819214.8, filed 20 Oct. 2008 in the United Kingdom, and Serial No. 0904912.3 filed 23 Mar. 2009 in the United Kingdom and which applications are incorporated herein by reference. To the extent appropriate, a claim of priority is made to each of the above disclosed applications.

This invention relates to composite products, for example laminate products. Preferred aspects of the invention relate to laminates or laminate products comprising a foam substrate and a skin on a surface of the substrate. Aspects of the invention relate to providing a skin or product having a surface effect, for example a simulated stone surface. Other aspects relate to providing a veneer on the surface. Other aspects relate to laminate products having a simulated surface effect. Preferred aspects of the invention relate to the production of laminated panels, for example for use in building, in furniture and as architectural components, for example architectural mouldings, although the invention has wide application to a broad range of composite products. Aspects of the invention described relate to doors, windows and other panels, in particular those used in buildings and in furniture.

Panels and other elements used in building have traditionally been made of natural materials. For example, doors and panels for buildings and furniture have traditionally been made from wood. Other walls and panels have been made or brick or stone. However, there is trend for building elements and other products which would traditionally used natural products to be made from "non-natural" or synthetic products, for example plastics materials. Such modern materials have many chemical, physical and cost advantages compared with traditional materials. Foam resin laminate panels of the kind comprising a foam resin layer and a skin are being employed increasingly in the building, decorating and furniture industries because of the wide range of useful properties achievable.

However, such modern materials have a different appearance from the traditional materials which can detract from their attractiveness for a particular application. Plastics materials having simulated wood grain and wood patterns are available and attempt to produce panels and doors which have an appearance close to that of traditional real wood. However, there is also a need to provide panels and other products simulating other types of surface, for example stone.

An object of aspects of the present invention is to solve or mitigate the above identified problems and/or other problems and/or to provide an improved composite product and method of forming a composite product.

According to an aspect of the invention, there is provided a method of forming a skin having a surface effect, for example a simulated stone surface, the method comprising: providing a mould surface, providing a surface material in granular form, spreading the grains of surface material across the mould surface, applying a sheet-form material to the mould, the sheet-form material covering the grains, and pressing the sheet-form material to the mould to form the skin having the grains bonded in its surface.

Preferably the sheet-form material includes a curable material.

Preferably, grains of the surface material can become embedded in a matrix of the curable material. Depending on the materials used and the manner of pressing the components together, the grains may extend from the surface of the matrix material, or may be substantially embedded or submerged in the surface.

The method may further include the step of carrying out a surface treatment to increase exposure of the grains in the surface. The surface treatment may include removing surface material or matrix from around the grains.

The method may further include the step of sandblasting the surface containing the grains of surface material. The term sandblasting should preferably be understood to include any technique in which particles are propelled onto the surface to remove part of the matrix material and thus to expose the grains in the surface. Any appropriate method may be used. The sand blasting may be carried out for example by air blasting sand particles at the surface.

Thus in examples the surface formed has a polymer matrix, but also includes grains of surface material which can give a realistic look to a simulated stone surface.

The grains of material may be any suitable material depending on the type of natural or other surface being simulated. Particular examples relate to the simulation of a sandstone surface. For example a simulated sandstone panel may be used to face a wall comprising a cheaper natural material and/or a synthetic material to produce a wall which looks as if it is formed of sandstone.

The grains may include sand. The grains may include sharp sand, soft sand or other sand or sand-like material. Other material for example grits might be used on their own or in combination to obtain the desired effect. If stone or a material other than sandstone is to be simulated or a different effect is being obtained, the grains might include other materials or mixtures of materials. The grains may include a mixture of different coloured grains which have been pre-sorted, or coloured. A colouring treatment may be applied to the grains before bonding, and/or applied to the simulated surface after the grains have been implanted.

The grains may be of any size or shape appropriate for the effect to be obtained. For example, if sandstone is to be simulated, then the grains preferably include actual sand grains, for example having a size between 0.5 mm and 2 mm.

Where other effects are to be obtained, the granular material may include other materials, for example grains having low or high hardness, angular or smooth shape and of different size. The grains are preferably insoluble, but this might not be essential, for example where the resulting product is to be used in an internal application and not exposed to weathering. The grains may comprise individual particles, or might comprise a powder, for example compressed to form granules.

Preferably the grains applied to the mould and spread onto the mould surface are loose grains.

The method may include a step of preparing the grains prior to application on the mould to separate aggregations or clusters of grains, for example which might form clusters in the surface of the skin. In other arrangements, the surface material may be applied as a block, the block being broken into particles during the pressing step to form the particles of surface material.

Where reference is made herein to grains of material, preferably the term is to be understood broadly to include any suitable particulate material. For example, where a simulated stone surface is to be formed, the particles or grains will be of relatively large size. In other arrangements, smaller sizes of particles will be used. The material of the particles or grains will be chosen depending on the nature of the surface finish being achieved.

In examples herein described, a simulated stone surface is formed. Other surface finishes and effects are possible. For example, ground glass can be used as the surface material to form a surface finish which may have a desirable texture. Alternatively, or in addition, the surface material may be coloured to give an attractive surface finish. Different colours or textures of surface finish may be applied to different sections of the surface. Different coloured sands may be used to produce an attractive and realistic "brick wall" effect; different coloured sands may be used to produce an attractive patterned panel. Preferably at least a part of the surface material is exposed at the surface of the skin to form a textured surface. Preferably particles of the particulate material are only partly embedded in the skin.

Preferably the surface effect is applied to a surface effect region of the substrate, and prior to the pressing step the sheet form material extends substantially continuously across the surface effect region. In contrast with prior methods of moulding using sheet-form material, for example SMC, the material preferably covers prior to pressing all of the area to which the surface material is to be applied. In this way, it has been found that lateral movement of the material can be reduced or minimised. In this way, movement of the surface material is reduced. Preferably the method is such that the material moves only substantially perpendicular to the surface of the substrate, for example into the cells of the substrate and/or into the interstices of the particulate surface material, for example as discussed further below.

It has been found that in many examples, if lateral movement of the material occurs during the pressing, then not only is the particulate surface material moved, but it can also become embedded deep into the skin, and thus the desired surface effect might not be formed.

Preferably prior to pressing the sheet-form material extends over substantially all of a surface of the substrate. In many examples, the surface finish will be applied over the whole of one, two or all surfaces of the substrate.

Preferably the surface material includes two different materials, a first surface material being applied in relation to a first region of the substrate; a second surface material being applied in relation to a second region of the substrate.

In this way, different regions of the composite material can have different surface finishes. The two surface materials may differ in relation to their chemical composition, particle size, colour and or other physical or chemical properties.

Preferably the size of the particles of the surface material is such that at least 50%, preferably at least 70% by weight of the particles have a size of at least 0.5 mm, preferably at least 1.0 mm.

It has been found that the size of particles of the surface material can affect how much of the surface material is incorporated into the skin, and can affect the surface texture achieved.

If a particle size which is too small is used, then in some cases the material, for example curable material, of the sheet-form material, is unable to penetrate well into the particulate material on pressing. Thus in some cases too little of the surface material is incorporated into the skin.

With a larger particle size, the curable material can move into the interstices between the grains of the surface material giving good penetration into the surfacing material and thus a better surface effect in many examples.

In some examples, even larger particles can be used. In some cases, gravel or pebbles can be embedded into the skin using methods described. Thus a "pebble dashed" effect can be achieved. For example, exterior panels for houses having a pebble dashed appearance can be formed.

Preferably the pressing is carried out in a single step to form the composite product.

In some examples, the pressing step can form the final product without further machining or other finishing steps being required.

The sheet-form material preferably covers substantially all of the area of the mould. Preferably there is substantially no spreading of the material in a direction parallel to the mould face during the pressing step. Such movement or spreading along the mould surface is generally undesirable because it would move the grains dusted onto the mould surface, leading to uneven and/or undesirable distribution of the grains in the skin.

Any of the methods described herein may include the step of applying a protective layer between the grains and the sheet-form material to reduce the movement of grains during the pressing step. For example, the protective layer may include a mesh or veil or fabric or other material. Preferably any such protective layer is porous to curable material during the pressing step so that the curable material can flow through the protective layer and around the grains.

The method may include the step of heating the mould surface prior to the pressing step. The heating of the mould may improve flow of the sheet-form material and improve the bonding of the grains in the material. The mould temperature may be for example greater than 100 degrees C., for example 140 degrees C.

The sheet-form material preferably comprises a sheet moulding compound (SMC). The SMC preferably includes a thermosetting polymer and reinforcing fibres. For example, the SMC may include a thermosetting resin, for example a polyester resin, together with reinforcing fibres, for example glass fibres. During the pressing or moulding step, the SMC material flows within the mould cavity, encapsulating the grains, and then cures forming the skin including the grains within its surface.

The skins formed may be used to face substrates to provide a simulated stone surface. For example, the skins may be bonded to a panel element to form stone-faced panels. Bonding may include chemical and/or physical bonding elements, for example adhesive and/or fixing elements for example screws and bolts.

The method may further include the step of providing a substrate, the skin being bonded to the substrate during the pressing step. Thus the substrate may be included in the mould cavity so that the SMC can be bonded and cured on the substrate. Bonding agents, for example adhesives, can be used to improve the bond.

The substrate may include surface formations for keying with the curable material. This can improve the bond between the substrate and the skin.

In some examples of the method, a substrate is arranged adjacent the sheet-form material during the pressing step, the substrate being such that gas or vapour can escape from the pressing region during the pressing step. Air trapped in the mould cavity and gases formed during the during reaction need to be released during the moulding operation. Preferably the pressing region is that area where the surface of the substrate and the sheet-form material are being pressed together, preferably in the region of the interface of the substrate and the material.

By removing gas or vapour that might otherwise remain and/or build up in that region, the pressure required to form the composite product can be significantly reduced in some examples. Preferably a region at at least a part of the surface of the material is porous to allow for the displacement of gas or vapour form the relevant areas. Preferably the substrate is such that gas or vapour can escape from the pressing region in a direction having at least a component in a direction generally transverse to the pressing direction in which the sheet-form material is pressed to the substrate.

Other formations (as an alternative or in addition) may be provided to assist the displacement of the gas. For example, grooves or channels could be formed in the substrate.

The configuration of the substrate which allows for the displacement of the gas may be inherent in that it arises from the nature of the composition of the substrate itself, and/or it may be provided by subsequent action, for example by machining the substrate or by chemical action on the substrate. Preferably the configuration of the substrate is such that it can release pressure in the pressing region.

Preferably the substrate includes a material having a cellular structure.

A cellular structure of the substrate can provide the necessary displacement of the gases in some arrangements. In preferred examples, the substrate comprises a material including a substantially open-celled structure. In this way, good movement of the gases away from the pressing region can be obtained in some examples. The substrate may comprise a foam material.

The substrate may comprise a foam material including a substantially open-celled structure. It is envisaged that the substrate might not form part of the ultimate product being formed. For example after the pressing step, the substrate may be removed from the skin.

In many cases, however, the substrate is a part of the formed laminate product and becomes bonded to the curable material during the pressing. Preferably the curable material extends into the surface of the substrate during the formation of the laminate so as to improve the mechanical bonding between the components. Alternatively, or in addition, an adhesive or other bonding agent may be used between the substrate and sheet-form material layer.

By applying a sheet-form material to a substrate comprising an open-celled structure, several advantages can be achieved. In particular, by using an open cell foam substrate, air in the mould and gases produced during the moulding process can pass into and through the open cell structure of the foam so that the risk of the air and gases leading to flaws and other deformities in the skin are reduced.

Furthermore, by bonding the sheet-form material to the substrate in the moulding process, efficiencies in manufacture of the laminate product can be achieved since in some examples, a further step to adhere the layers together might be avoided. In preferred examples, the material of the sheet-form material passes into the cells or other formations of the substrate material during the moulding process and provides a mechanical bond between the substrate and the moulded skin. This can reduce the risk of delamination of the skin from the substrate core, provide a stable product when exposed to heating/cooling cycles and provides a monolithic composite structure without the need for an adhesive to be applied or the assembly of parts.

In preferred examples, the sheet-form material forms a skin on the substrate, which is mechanically keyed into substrate giving a good bond between the skin and the substrate. In some cases it has been found that the bond achieved at the interface of the skin and the substrate is in fact stronger then the material of the substrate itself. A laminate product made by this method may fail within the substrate layer, and not at the interface.

The sheet-form material may include a sheet moulding compound (SMC). Preferably the SMC includes a thermosetting polymer, for example a resin, for example a polyester resin, together with reinforcing fibres, for example glass fibres.

The laminate product produced may comprise for example a substrate having one skin of SMC including the surface material, or may comprise a core sandwiched between two skins. Other arrangements are possible. In some cases, for example, the product may comprise a core having a first skin including SMC with the granular material, and a second skin including just the SMC layer and no added granular material. This arrangement might be preferred where different finishes were required on different surfaces of the product, for example for use as panels or kitchen work surfaces. Alternatively, the simulated stone surface (or other surface effect) may be provided on the other surface. Two-sided simulated panels or other products could be formed. For example a panel might have one type of simulated stone on a first side, and a second type on the other, or for example a wood effect surface on the other.

The substrate can form a part of the final product, or it is envisaged that a part of all of the substrate might be removed, for example by machining, after the skin has been formed. Where the curable material has moved into the structure of the substrate, preferably only the part of the substrate material not including the curable material is removed.

For example, removing some or all of the substrate may form a skin having a surface effect which may be fitted to a further panel, or retrofitted to an existing structure, for example a building. Thus a panel having a stone, brick or other finish can be applied. Preferably the substrate forms a part of a final product derived from the composite product.

By providing the matrix in the form of a sheet, the use of liquid resin can be avoided. This can give considerable time savings in the manufacture of the product, as well as benefits regarding the ease of use of the matrix material and a reduction in the manpower and equipment required to apply the matrix material or pre-polymer to the mould.

The core having two skins might be formed in a single pressing operation in which the required layers were arranged and then pressed together in a mould to bond the layers together.

The method may include the step of providing a second layer including a sheet-form material over the substrate, the substrate being sandwiched between the first and second layers of sheet-form material, and pressing the second layer and the substrate together.

The method may further include the step of spreading the grains of surface material across the second layer of material. As above, further layers may be provided between the substrate, SMC, granular layer, further moulding surfaces, as required. Preferably where other layers are provided, they are such as to allow the SMC material to flow into and bond with the substrate and/or the granular material.

In this way it can be seen how a two-sided panel or other article can be formed in a single pressing operation. Alternatively, two or more steps might be used. A further layer of granular material can be provided at the second layer.

In some embodiments of the invention, the sheet-form material is applied directly to the substrate. In other examples, one or more layers may be provided between the substrate and the sheet-form material, for example to enhance adhesion or bonding of the two parts. For example an adhesive might be applied between the parts.

The components will be pressed together between suitable moulds or plates. In preferred examples, at least one mould part is provided which includes a pattern to be taken by the components during the pressing or moulding step.

For example, where the laminate product is to be a panel for a wall, a mould surface might include for example recessed regions and other surface features so that the moulded door might look more realistic compared with a traditional sandstone wall. For example projections or recesses simulating the courses of stones may be provided.

In some examples, one or more further layers might be applied between the granular material and/or sheet-from material and the tool surface itself. In some examples, materials might be applied to the tool surface, for example to assist moulding and/or release of the product from the mould.

A coating composition may be applied to the mould which forms a coating on the product after moulding. The composition may be coloured. The composition may be applied to the mould in the form of a powder, for example using an electrostatic method.

A sheet or veil may be provided between the sheet-form material and the mould surface. In some examples, it is thought that the use of a veil has the effect of reducing movement of the matrix material in the plane of the mould. It is a preferred feature of the aspects of the present invention that the movement in the plane of the mould surfaces is reduced; it is thought that this gives better finish to the moulded products in some arrangements.

Preferably the method includes applying heat and pressure to the granular material and the sheet-form material. Preferably the sheet-form material is cured directly onto the granular material and substrate.

Preferably the method comprises a method of compression moulding.

Preferably the pressure and temperature and cycle time are chosen so that the sheet-form material sets in the mould.

Preferably the mould is profiled to produce the desired shape of skin.

It is envisaged that the methods of the present invention can be used to form products having no surface mouldings, for example flat panels. In this case, the substrate may comprise any suitable material. Preferably the substrate comprises a rigid material so that the pressing step can be carried out most successfully and the substrate can provide desired mechanical properties to the product. Such a method may for example be used to form flat-fronted panels or doors as well as other articles, for example table tops and kitchen worktops.

In some examples, where a contoured surface is required, the required contours or mouldings can be formed on the surface of the substrate. For example, the required shape may be formed in the substrate by machining, for example, a substrate block comprising polyurethane foam.

The shape of the mould is matched to the contours of the substrate so that when the components are pressed onto the mould surface, the resulting panel has the skin having the required contours bonded to the shaped substrate.

Preferably the substrate comprises a crushable material such that, during the application of pressure step, a surface of the substrate is moulded.

The substrate may comprise more than one material, for example the substrate may comprise regions of different materials or materials having different mechanical properties.

The substrate may comprise a frangible material. Such a material may be rigid and non-crushable in the normal use of the resulting product, but during the pressing step, the substrate material can be crushed to mould the substrate. Where a mould surface is used, the substrate material can be crushed so that its surfaces facing the mould conform to the contours of the mould surface.

This method is particularly advantageous in some examples. In particular, it can remove the requirement to machine the required contours into a surface of the substrate before the application of the skin.

Simple blocks of the substrate can be used in the method to form shaped or moulded products.

The moulding may provide surface contours of the product, and/or may provide the shape of the product itself. It is envisaged that shaped products could be formed using this method.

In examples described, the substrate comprises a plastics material, but other any other suitable material could be used.

It is envisaged that the invention might be applied where the substrate comprises a material which is rigid even on the application of pressure, but preferably the substrate comprises a material which can be controllably crushed during application of pressure so that a surface of the substrate can take on the contours of a part of the mould.

In this way, moulded laminated products can be efficiently produced in a single step from a sheet-form curable material and a block of substrate material.

In examples of the present invention, the substrate material preferably comprises a rigid foam, for example a foam material obtained by causing or allowing a mixture of phenolic resole, acid hardener and finely divided particulate solid to cure under conditions in which foaming for the mixture is caused primarily or solely by volatilisation of small molecules present in the resole or formed as a by-product of the curing reaction. The formation of an example of such foams is described in detail in EP 0010353 and foamed bodies comprising these foams can be obtained as ACELL foam from Acell Holdings Limited, UK.

Preferably the substrate material has a density in the range of 100 to 500 kg/m3, more preferably 120 to 400 kg/m3 and most preferably 120 to 250 kg/m3. It has been found that such foams can be caused to reproduce on a face thereof the detail of even quite fine and complex mould surfaces by the application of a suitable pressure the level of which depends on the nature and density of the foam material but can readily be determined by simple experiment.

Such a substrate has a substantially open-cell structure so that as the layer of sheet-form material is pressed into the cells or pores of the material, the gas or vapour therein can be readily displaced.

While any suitable material may be employed, aspects of the invention are particularly suitable for use with substantially rigid structural materials, for example foams, that is, preferably self-supporting foams which are resistant to deflection under load and do not collapse under moderate pressure. The physical properties of such foams, especially the compressive strength and deflection under load are believed to be related to (amongst other factors) cell wall thickness. In some examples, the cell size for suitable substrate material is found to be in the range of about 0.5 mm to 5 mm, more preferably 0.5 or 1 mm to 2 or 3 mm.

It is preferred for the substrate to include a filler material, for example a finely divided filler material. Foamed phenolic resin reinforced with a finely divided filler is particularly preferred in some arrangements because of the excellent combination of physical properties and fire resistance that can be obtained for laminates formed from it.

Preferably at least some of the cells or pores of the foamed substrate are open to the surface of the face on which the layer of sheet-form material is to be applied, and preferably the open out below the surface to a greater width than the opening, thereby providing an undercut which can enhance the keying of the layer material to the substrate.

In some examples, the thickness of the layer of sheet-form material provided on the substrate will be at least 1 mm but thicknesses of less than 1 mm are also contemplated. If desired, the thickness of the layer of material may be reduced before or after setting.

In some examples a further layer of sheet-form material is applied to an opposing surface of the substrate, the application of pressure sandwiching the substrate between the two layers of sheet-form material. In this case, a further granular material layer or other layer may or may not be provided on the surface of the other layer of sheet-form material.

In this way, a laminate product including a skin on two sides can be formed. For example, were the product comprises a door, both sides of the door can be formed in a single step. In other arrangements, the composite product may be formed by applying the particulate material to the upper surface only of the sheet-form material.

A further aspect of the invention provides a method of forming a polymer skin having a surface effect, for example a simulated stone surface, the method comprising, providing a sheet-form curable material, providing a surface material in particulate form, applying the surface material to at least a portion of a surface of the sheet-form curable material, and pressing the surface material into the surface of the sheet-form curable material.

According to an aspect of the invention, there is also provided a method of forming a composite product with a skin having a surface effect, the method comprising: providing a substrate comprising a material including a substantially open-celled structure, or a structure that is substantially porous to gas or vapour at the pressing region; providing a sheet-form curable material; providing a surface material in particulate form; and pressing the sheet-form curable material and the surface material to the substrate to form the composite product such that the sheet-form material becomes bonded to the substrate and the surface material becomes embedded in an exposed surface of the sheet-form material.

A further aspect provides a method of forming a composite product with a skin having a surface effect, the method comprising: providing a substrate; providing a sheet-form curable material; providing a surface material in particulate form; and pressing the sheet-form curable material and the surface material to the substrate to form the composite product such that the sheet-form material becomes bonded to the substrate and the surface material becomes embedded in an exposed surface of the sheet-form material, the substrate being such that gas/vapour at the interface of the sheet-form material can pass through at least a portion of the substrate during the pressing step. In examples of the invention, the surface effect includes a simulated stone surface.

Preferably the pressing is carried out as a single step.

Preferably the composite product comprises the substrate and a skin of the sheet-form material bonded to a surface of the substrate, and further includes grains or particles of the surface material embedded in an exposed surface of the skin of sheet-form material.

Where reference is made to a open-celled structure, preferably the structure of the surface of the substrate is such that gas and/or vapour can be displaced from the pressing region.

Preferably the method further includes providing a pressing member and pressing the sheet-form curable material and the surface material to the substrate using the pressing member.

For example the pressing member may comprise a plate. The plate may or may not be contoured, for example depending on the profile of the composite product to be formed.

In an alternative arrangement, however, the substrate is provided with a profiled or contoured surface, the sheet-form material being pressed onto the contoured surface during the pressing step. The surface may be profiled by any appropriate method. Examples include routing or cutting sections of the substrate material from the surface, and/or providing further sections or elements at or attached to the surface. Where the substrate material includes a crushable material, the contoured surface may be formed by pressing or crushing one or more portions at the surface of the substrate.

Thus the method may further include the step of providing a contoured substrate surface, the sheet-form material being pressed onto the contoured surface.

The step may include pressing the substrate with a moulding element to form the contoured substrate surface.

The method may then include the step of pressing the sheet-form material between the contoured surface and a layer of the surfacing material.

The surfacing material may be provided at only a part, several portions or all of the sheet-form material. The sheet-form material may be provided at one or more portions or at all of a surface of the substrate.

The layer of the surfacing material is preferably at least the depth of the profile of the surface.

In this way, the surfacing material can act to press the sheet-form material into the contoured surface of the substrate. In such an arrangement, the pressing member need not be profiled, and for example may comprise a flat plate.

For example, where the method is used to form a profiled door panel, the required profile could be formed in the substrate surface. In a first example, the method includes the steps of arranging the substrate with the contoured surface uppermost, positioning the sheet-form material over the substrate, applying a layer of the surface material over the sheet-form material, providing a pressing member over the surface material, and pressing the pressing member towards the surface of the substrate to form the composite product.

During the pressing, the particulate or granular material of the surface material acts to press the sheet-form material into the voids and contours of the profiled surface.

While some of the particulate or granular material is taken into the surface of the sheet-form material to form the simulated stone surface, the remainder acts as a mould surface complimentary to the contoured substrate.

The pressing member may be heated to facilitate the moulding and curing of the sheet-form material. Alternatively, or in addition, the surface material is heated prior to the pressing step.

For example the surface material may be heated prior to application to the sheet-form material.

The surface material may for example be heated to a temperature of about 130 degrees C.

In such an arrangement, the pressing member might not be heated. Indeed, it may not be necessary for the pressing member to have high heat resistance. For example, a board, for example of wood, might be provided as the pressing member. The cost of such a pressing member is considerably less than that of existing steel or aluminium presses. It has been found that, surprisingly, good quality products can be made using only basic apparatus and low temperatures and pressures.

According to the invention there is provided a method of producing a composite product having a surface effect, for example a simulated stone surface, the method including the steps of providing a substrate, positioning the sheet-form curable material over the substrate, applying a layer of particulate surface material over the sheet-form material, providing a pressing member over the surface material, and pressing the pressing member towards the surface of the substrate to form a composite product comprising the substrate, a skin on the surface of the substrate and the surface material embedded into the surface of the skin.

In a second example, the substrate is provided at the upper region of the pressing arrangement, and the method includes the steps of arranging a base member and applying a layer of the surface material over the base member positioning the sheet-form material over the layer of surface material arranging the substrate over the sheet form material, and pressing the substrate towards the base member to form the composite product.

If the substrate is profiled, preferably the profiled surface is arranged adjacent the sheet-form material. During the pressing, the particles of the surface material acts to press the sheet-form material into the voids and contours of the profiled surface.

It will be appreciated that in this, and other, arrangement, other layers, components or materials could be placed between the elements described in the pressing arrangement. For example an adhesive may be provided between one or more of the layers or elements. In some examples, however, the use of such adhesives is not required. The keying of the sheet-form material into the surface of the substrate gives a good bond between those components without additional adhesive being required. A veil may be provided, for example between the sheet-form material and the surface material.

The base member may be heated to facilitate the moulding and curing of the sheet-form material. Alternatively, or in addition, the surface material is heated prior to the pressing step.

For example the surface material may be heated prior to application of the sheet-form material.

The surface material may for example be heated to a temperature of about 130 degrees C.

The composite product may be the subject of further finishing before use. For example, in some arrangements, at least a portion of the substrate material is removed from the composite product.

Once the open-celled substrate has been used as a base for forming the skin having the simulated surface, some of the substrate may be removed. The composite product may be used alone or for example as a skin or cladding, for example for cladding a building. The composite product may be used to provide a high-quality and performance coating material over a cheaper and/or less high performance material.

Alternatively or in addition, the thickness of the substrate could be chosen such that once the moulding is complete, and the sheet form material has been moulded onto the substrate, the thickness of the substrate not at the interface of the two materials is small. For example, depending on the depth of the profile required in the surface the thickness of the substrate might be about 10 mm, the thickness of the sheet-form material 4 mm and the thickness of the particulate material, about 40 mm.

The surfacing material may be any appropriate granular or particulate material. For example, sand, terracotta dust or marble chippings may be used.

A further aspect of the invention provides a method of forming a polymer skin having a surface effect, for example a simulated stone surface, the method comprising: providing a sheet-form curable material, providing a surface material in particulate form, and pressing the surface material and the sheet-form material together such that particles of the surface material become embedded into the material, and curing the material to form a polymer skin.

Preferably the method further includes the step of providing a substrate adjacent the sheet-form curable material, the surface of the substrate being such that gas and/or vapour can be displaced from the pressing region.

The surface of the substrate preferably has a substantially open-celled structure. The substrate may include an open-celled foam.

Preferably the method further includes carrying out a curing step.

The sheet form material preferably includes a thermoset. The material may include further components, for example components to enable the material to be handled in sheet-form.

The sheet-form material of aspects of the invention may include any appropriate matrix composition. For example, the matrix may include one or more of a thermosetting polymer, for example an epoxy resin, a phenolic resin, a bismaleimide or polyimide, and/or any other suitable material. The material may include melamine, which is useful as a fire retardant. The matrix materials may further include hardeners, accelerators, fillers, pigments, and/or any other components as required. The matrix may include a thermoplastic material.

The sheet-form material may comprise reinforcement, for example reinforcing fibres. The sheet-form material may include glass fibres.

Preferably the layer of sheet-form material comprises SMC (sheet moulding compound).

The SMC may comprise two main components: a matrix and a reinforcement.

The matrix preferably comprises a resin which preferably includes polyester, but may include vinyl ester, epoxy, phenolic, or a polyimide. Preferably the matrix comprises a thermosetting resin.

The matrix may further comprise additives, for example minerals, inert fillers, pigments, stabilizers, inhibitors, release agents, catalysts, thickeners, hydrating additives and/or other suitable materials.

The reinforcement preferably comprises glass fibres. The fibres may be cut, for example into lengths of 5 cm or less, or may be continuous. Other reinforcement materials could be used, for example carbon fibres.

There are benefits in using SMC. For example, SMC has low density but favourable mechanical properties compared with other materials for example thermoplastics and also exhibits good thermal properties. Of particular importance for some applications, for example building applications, resistance to fire is good. SMC also shows good noise reduction qualities, also important where used as a building material and good chemical resistance.

The fibres may be short fibres, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular, and may comprise a fabric, mat, felt or woven or other arrangement. The material may include short fibres. Fibres may provide a continuous filament winding. More than one layer of fibres may be provided.

The fibres may include one or more materials. For example the fibres may include one or more of carbon fibres, glass fibres, aramid fibres and/or polyethylene fibres. Kevlar (RTM) fibres may be used. Products including such fibres could be used for protective devices and building products. For example, some products of the present invention may find application as armoured or bullet-proof products. For example, protective panels may be formed having Kevlar (RTM) fibre reinforcement.

The sheet-form material may comprise an impregnated fibre composite material.

Surprisingly, it has been found that sheet-form materials including long fibres can be used in the methods of the present invention, and also sheet-form materials including fibres which are woven together can be used. Without wishing to be bound by theory, it is thought that such materials having relatively long fibre reinforcements and/or including fibre mats or other networks or structures can be used because the movement of material in the mould in a direction along the mould surface is relatively low.

Alternatively or in addition to reinforcement being provided as an integral part of the sheet-form material, reinforcement may be provided as a separate layer, for example arranged between the sheet-form material and the substrate.

Where the separate layer of reinforcement is provided, it may be located across the whole of the substrate, or may for example be provided in only parts. For example, if there is a particular section of the product which is more susceptible to damage or attack, additional reinforcement can be provided in that region. For example, where the product is to be used in a door, additional reinforcement may be provided at regions of the door which are thinner than others for due to decorative moulding or other features and/or at regions of the door which are more susceptible to damage.

Thus the arrangement may include sheet-form material having integral reinforcement, for example short fibres and/or longer fibres which may be arranged as fabrics or mats, for example. In addition, or alternatively, reinforcement may be provided as one or more layers separate from the sheet-form material. The additional layer of reinforcement may include short and/or long fibres, for example of materials mentioned above.

During the pressing or moulding, preferably the matrix material, for example resin, flows into the structure of the fabric or other arrangement, to form a bond.

Preferably the layer of sheet-form material comprises a curable composition. In some examples of the invention, the sheet-form material might be settable other than by curing.

Preferably the pressure and heat is chosen such that the sheet-form material is moulded and then sets in the mould.

Preferably the viscosity of the sheet-form material is reduced during the pressing step.

Preferably the sheet-form material is one that reduces in viscosity and or at least partially liquefies on the application of heat and/or pressure. In this way, some flow of the material in the mould can be achieved. This can lead to improved moulding of the material, more uniform thickness and/or reduction of moulding defects. Preferably, the material at least partly flows into cells of the substrate material during the pressing step. Preferably the material and substrate are such that the material only partly flows into the substrate during the moulding step so that good bonding between the skin and the substrate is obtained while retaining a suitable skin thickness for the required mechanical and other properties of the laminate.

Preferably the sheet-form material is applied as a single thickness.

Preferably the material, for example the SMC is applied to the mould in unfolded form. This leads to ease of manufacture, and also can reduce the pressure required for the moulding step. A plurality of single thickness layers may be provided, the layers preferably overlapping at the edges to reduce the risk of gaps being formed in the skin.

Preferably the sheet-form material is applied to substantially a whole mould surface.

Having the SMC extend substantially across the full area of a mould face has a number of advantages. For example, in some arrangements, the pressure required to complete the moulding step can be reduced by reducing the amount of lateral flow required of the material in the mould. Also, by reducing the amount of flow of material across the mould surface, abrasion and/or wear of the surface of the mould can be reduced. In this way, the material used for the mould can be selected from a wider range of candidate materials as discussed in more detail below.

The sheet-form material can be applied to the mould as a single piece of material.

Preferably a plurality of sheets of sheet-form material is applied to a mould surface.

In some arrangements, for example because the mould surface is large, or to improve the ease of handling the sheet-form material, several pieces of sheet-form material can be applied to the mould and/or the substrate. Preferably an edge of one sheet overlaps with an edge of an adjacent sheet. In this way, the risk of gaps being formed in the skin on the substrate is reduced. The additional material at the overlapping region has been found not to lead to reduced quality of the finished product: any excess material in that region can, in some examples, into the substrate and/or laterally within the mould.

Thus in some examples, in particular where complex shapes are to be formed, several pieces of sheet-form material can be provided.

This feature is further advantageous because it can lead to a reduction in the amount of potentially waste sheet-form material. Smaller pieces of material, for example off cuts from larger pieces or cut outs (for example if a panel is to include a glazed section) need not be disposed of but can be used.

Preferably the pressure applied is pressure is less than 200 tonnes, preferably less than about 100 tonnes. This is the pressure applied for example to form a panel door. In many examples, the pressure applied will be equivalent to less than about 50, 25, 10 or even less than about 5 kg/cm2.

As discussed above, traditional SMC manufacturing processes requires enormous pressure to evacuate the air trapped during the forming of the SMC product. By putting the foam substrate behind the SMC skin prior to pressing, the air can escape though the cellular structure of the foam reducing greatly the abrasion on the tool surface. Also considerably lower pressures are required. Preferably the pressure is less than 500 tonnes, preferably less than 200 tonnes, preferably less than about 100 tonnes.

Preferably the sheet-form material is applied to a mould surface comprising aluminium or aluminium alloy.

Where lower pressures are used, aluminium tools can be used. This can give rise to low cost tooling, flexible production and less downtime due to tool change over in view of the reduced weight of an aluminium mould and speed of heating or cooling an aluminium mould compared with a stainless steel mould. For example, the volume of an aluminium tool could be significantly smaller than that of a corresponding tool of steel, and this combined with the lower density of aluminium leads to considerable weight advantages when using aluminium moulds.

Where reference is made herein to components being made of or comprising aluminium, preferably the relevant component includes aluminium or an appropriate aluminium alloy or other material including aluminium.

The substrate may include surface formations on at least a part of the substrate surface, so that the material of the sheet-form material keys with the formations to bond the material to the substrate.

The method may include the step of providing further components between the two layers being pressed together.

Other components may also be sandwiched between the skins during the moulding process. For example where the product is a door, the doorframe components, glazing panels and other components might be arranged in the mould so that they can be formed into the product in a single moulding step. It is envisaged that a substantially complete product, for example a door, could be made in a single moulding operation using the present invention.

To give improved rigidity, in the finished product (door, window or panel), in general the skins will be spaced not only by a core but also by a frame or frame members such as stiles, rails, and/or mullions. The frame members may be of wood, metal (for example, aluminium) or plastics (such as uPVC) or a combination of these, e.g. metal-reinforced plastics. The plastics material may contain filler, if desired, to improve hardness and/or rigidity.

In a preferred embodiment, the core occupies substantially the entire volume or volumes within the frame; i.e. substantially the whole space within the panel defined by the skins and the components of the frame. It is also preferred that the substrate is bonded to each skin over substantially the entire area of the substrate which is in contact with that skin, even when the skin includes one or more depressed zones, since this enhances the overall strength of the panel and the resistance to bowing.

In one preferred embodiment, the substrate is in the form of one or more blocks, for example rectangular blocks, held in a frame, at least one of the skins includes one or more depressed zones and the portion of the block or blocks behind each said zone conforms to the contours of said zone as a result of selective controlled crushing of the substrate in the area behind said zone.

The invention also provides a product formed by a method as described herein and an apparatus for use in a method as described herein.

Also provided by an aspect of the invention is a skin having a simulated stone surface, the skin comprising an SMC layer and grains of a surface material embedded in the surface of the SMC layer.

Also provided by the invention is a composite product comprising a substrate and a skin of sheet form material bonded to a surface of the substrate, and further including grains of a surface material embedded in a surface of the skin of sheet-form material.

Preferably the grains include grains of sand.

The substrate may have formations on its surface, the material keying with the formations. The substrate may be substantially open-celled the material extending into cells of the open-cell substrate.

Where reference is made herein to for example the skin, layer or substrate being bonded to another element, it is to be understood that, preferably, at least a part of the skin, layer or substrate is so bonded. In some examples, the skin or layer or substrate will be attached over the whole of its interface with the other element.

Wood Veneer

Doors, windows and panels, for example for buildings and furniture have traditionally been made from wood, and may be glazed or unglazed. However, unless specially treated, wood can warp if exposed to changes in temperature and/or humidity. This can be disadvantageous aesthetically and can also lead to difficulties in opening and closing the doors, windows and partitions. The latter are particular problems in the light of modern building safety regulations, where warped doors, windows and panels can constitute a fire hazard. Furthermore, wood can be relatively expensive to obtain and there are major environmental concerns in respect of the use of certain types of wood.

Over the last few decades there has therefore been a trend towards providing artificial doors, panels and windows. One type of artificial door, panel and window is a moulded article. Moulded article can be formed by a number of different methods.

Foam resin laminate panels of the kind comprising a foam resin layer and a skin are being employed increasingly in the building, decorating and furniture industries because of the wide range of useful properties achievable.

In a known method of forming panels, the panels comprise a pair of outer skins and an internal foam core. The skin or skins and the foam core are formed separately and may then bonded together by means of an adhesive or by heat. However, there are disadvantages with such panels, for example with delamination of the skin for example on failure of the adhesive.

In known systems, the skins may be formed by compression moulding of a sheet moulding compound (SMC). The SMC includes a thermosetting resin, for example a polyester resin, together with reinforcing fibres, for example glass fibres.

To make the formed skin, the sheet moulding may be folded to form a block of charge and placed into a preheated moulding cavity. The mould is closed and pressure is applied to press the moulding compound so that it spreads to all parts of the mould. Heat and pressure is applied until the moulded material has cured. The mould is then opened and the formed skin is removed.

The shaped skins can then be secured to opposite sides of a frame, prior to injecting a foam into a cavity located between the skins. The foam acts as a filler and can assist in providing increased improved rigidity and insulation the door. The door can then be finished as appropriate.

In a further method described in UK Patent Application No. 0719343.6, the skins are bonded directly to a foam core during a moulding step. A layer of sheet-form SMC is provided on the mould surface, a foam core is placed on the layer of SMC, and pressure is applied to mould the components together. During the moulding step, the core and SMC layer are moulded to the desired shape, and the SMC material becomes bonded to the core.

Such methods can give laminated products having good physical and chemical properties and good aesthetic finish, but their appearance is not the same as real wood. Thus the laminated products are not used for some applications where a real wood appearance is desired.

An object of aspects of the present invention is to solve or mitigate the above identified problems and/or other problems and/or to provide an improved composite product and method of forming a composite product.

According to an aspect of the invention, there is provided a method of forming a laminate product, the method comprising: providing a layer comprising a sheet-form material; providing a substrate including a porous structure; and providing a veneer element; the method including the step of applying the substrate to a first surface of the sheet-form material, applying the veneer element to a second surface of the sheet-form material, and applying pressure to press the veneer element, the sheet-form material and the substrate together to form the laminate product.

In this way, a laminate product comprising a veneer surface can be formed. The veneer can provide a desirable aesthetic finish to the product and/or desired physical and/or chemical surface properties of the product.

Preferably the term veneer is to be understood, where appropriate, to refer to a thin surface layer applied to the sheet-form material.

While it is envisaged that a broad range of materials could be used in the veneer, in preferred arrangements, the veneer includes wood.

The veneer element may include wood. The veneer may include two or more different woods, and/or other components in addition to wood. Such components may for example be include to enhance the physical and/or chemical properties of the veneer, and might for example include binders, stiffeners, hardeners, and/or other components. Such other components may include for example polymer resins, fillers, varnishes and/or other suitable components. The veneer may include a surface pattern, and/or may itself comprise a laminate material.

Alternatives are possible. For example the veneer might not include wood. The veneer may include a simulated wood surface, for example the veneer may include a polymer having a surface finish simulating wood or other material, for example stone. The surface of the veneer may be flat or may be provided with surface formations, for example for aesthetic reasons, for example to simulate a wood, stone or other surface. Alternatively or in addition, surface formations may be provided on a surface of the veneer which will not be visible in the laminated product. For example, surface formations may be provided on the surface to be bonded to the sheet-form material, for example to improve the strength of the interface between the veneer and the sheet-form material.

The thickness of the veneer may be 5 mm or less, preferably 3 mm or less. The thickness of the veneer will depend on the application of the product, and the physical and aesthetic properties required.

Preferably the sheet-form material comprises a curable material, for example a thermoset.

Preferably the curable material flows into the veneer element during the pressing step. Preferably at least some part of curable material flows into a surface of the veneer during pressing. Preferably the material is keyed into the veneer layer. In this way, a strong bond between the matrix and the veneer element can be obtained. Where the veneer element comprises wood, it is found that the curable material is pressed into spaces between the fibres of the wood to form a strong bond between the two layers.

Alternatively or in addition, adhesive material may be applied between the sheet-form material and the veneer element to aid bonding.

The veneer element may extend over substantially all or only a part of the sheet-form material and/or the substrate area.

Preferably the configuration of the substrate is such that gas and/or vapour can be displaced from the pressing region. Preferably the pressing region is that area where the surface of the substrate and the sheet-form material are being pressed together, preferably in the region of the interface of the substrate and the material.

By removing gas or vapour that might otherwise remain and/or build up in that region, it has been found that the pressure required to form the composite product can be significantly reduced in some examples.

Preferably the nature of the surface of the substrate is such that the gas or vapour can escape from the pressing region. For example, a region at at least a part of the surface of the material is preferably porous to allow for the displacement of gas or vapour from the relevant areas.

Preferably the substrate is such that gas or vapour can escape from the pressing region in a direction having at least a component in a direction generally transverse to the pressing direction in which the sheet-form material is pressed to the substrate.

Other formations (as an alternative or in addition) may be provided to assist the displacement of the gas. For example, grooves or channels could be formed in the substrate.

The configuration of the substrate which allows for the displacement of the gas may be inherent in that it arises from the nature of the composition of the substrate itself, and/or it may be provided by subsequent action, for example by machining the substrate or by chemical action on the substrate. Preferably the configuration of the substrate is such that it can release pressure in the pressing region.

Preferably the substrate includes a material having a cellular structure.

A cellular structure of the substrate can provide the necessary displacement of the gases in some arrangements. In preferred examples, the substrate comprises a material including a substantially open-celled structure. In this way, good movement of the gases away from the pressing region can be obtained in some examples. The substrate may comprise a foam material.

The substrate may comprise a foam material including a substantially open-celled structure.

It is envisaged that the substrate might not form part of the ultimate product being formed. For example after the pressing step, the substrate may be removed from the resin and veneer laminate. The laminate might then subsequently be used as a skin in the production of other products, for example the panels and doors described above.

Preferably, however, the substrate becomes bonded to the sheet-form material during the pressing. Preferably the curable material extends into the surface of the substrate during the formation of the laminate so as to improve the mechanical bonding between the components. Alternatively, or in addition, an adhesive or other bonding agent may be used between the substrate and sheet-form layer.

Thus in preferred arrangements, curable material moves into the laminate element and the substrate surface during the pressing.

By applying a sheet-form material to a substrate comprising an open-celled structure, several advantages can be achieved. In particular, by using an open cell foam substrate, air in the mould and gases produced during the moulding process can pass into and through the open cell structure of the foam so that the risk of the air and gases leading to flaws and other deformities in the skin are reduced.

Furthermore, by bonding the sheet-form material to the substrate and the veneer in the moulding process, efficiencies in manufacture of the laminate product can be achieved since in some examples, a further step to adhere the layers together might be avoided. In preferred examples, the material of the sheet-form material passes into the cells or other formations of the substrate material during the moulding process and provides a mechanical bond between the substrate and the moulded skin. This can reduce the risk of delamination of the skin from the substrate core, provide a stable product when exposed to heating/cooling cycles and provides a monolithic composite structure without the need for an adhesive to be applied or the assembly of parts.

The substrate can form a part of the final product, or it is envisaged that the substrate might be removed, for example by machining, after the skin has been formed. Preferably the substrate forms a part of a final product derived from the composite product.

By providing the matrix in the form of a sheet, the use of liquid resin can be avoided. This can give considerable time savings in the manufacture of the product, as well as benefits regarding the ease of use of the matrix material and a reduction in the manpower and equipment required to apply the matrix material or pre-polymer to the mould.

However, in other arrangements, liquid resin might be used. Therefore the invention further provides a method of forming a laminate product, the method comprising: providing a layer comprising a curable material; providing a substrate; and providing a veneer element; the method including the step of applying the curable material to the veneer, applying the substrate to a surface of the curable material, and applying pressure to press the veneer element, the curable material and the substrate together to form the laminate product.

In preferred examples, the sheet-form material forms a skin on the substrate, which is mechanically keyed into substrate giving a good bond between the skin and the substrate. In some cases it has been found that the bond achieved at the interface of the skin and the substrate is in fact stronger then the material of the substrate itself. A laminate product made by this method may fail within the substrate layer, and not at the interface.

The sheet-form material may include a sheet moulding compound (SMC). Preferably the SMC includes a thermosetting polymer, for example a resin, for example a polyester resin, together with reinforcing fibres, for example glass fibres.

The laminate product produced may comprise for example a core having one skin of SMC and veneer applied to a surface, or may comprise a core sandwiched between two skins. Other arrangements are possible. In some cases, for example, the product may comprise a core having a first skin including SMC and an outer layer of the veneer, and a second skin including just the SMC layer and no additional veneer. This arrangement might be preferred where different finishes were required on different surfaces of the product, for example for use as cupboard doors.

The core having two skins might be formed in a single pressing operation in which the required layers were arranged and then pressed together in a mould to bond the layers together.

The method may include the step of providing a second layer including a sheet-form material, applying the second layer at a surface of the substrate, the substrate being sandwiched between the first and second layers of sheet-form material, and pressing the second layer and the substrate together.

In this way it can be seen how a two-sided panel or door can be formed in a single pressing operation. Alternatively, two or more steps might be used. A further layer of veneer material can be provided at the second layer.

In some embodiments of the invention, the sheet-form material is applied directly to the substrate. In other examples, one or more layers may be provided between the substrate and the sheet-form material, for example to enhance adhesion or bonding of the two parts. For example an adhesive might be applied between the parts.

The components will be pressed together between suitable moulds or plates. In preferred examples, at least one mould part is provided which includes a pattern to be taken by the components during the pressing or moulding step.

For example, where the laminate product is to be a door, a mould surface might include for example recessed regions and other surface features so that the moulded door might look more realistic compared with a traditional wooden door.

Preferably the veneer element has appropriate dimensions and is formed of a suitable material so that it can be moulded, as required.

Preferably the method includes the step of applying the layer of sheet-form material to a mould, the method further including the step of pressing the substrate to the sheet-form material to the mould.

Preferably the method includes the step of applying the veneer directly to a surface of a mould.

In some examples, one or more further layers might be applied between the veneer and/or sheet-from material and the tool surface itself. In some examples, materials might be applied to the tool surface, for example to assist moulding and/or release of the product from the mould.

A coating composition may be applied to the mould which forms a coating on the product after moulding. The composition may be coloured. The composition may be applied to the mould in the form of a powder, for example using an electrostatic method.

Preferably the method includes applying heat and pressure to the veneer and the sheet-form material. Preferably the sheet-form material is cured directly onto the veneer and substrate. This important feature may be provided independently. A broad aspect of the invention provides, curing a sheet of curable material directly onto the surface of a veneer and of a substrate, preferably a substrate configured to displace gas or vapour from the interface region, preferably the substrate comprising an open-cell foam.

Preferably the sheet-form material comprises a thermosetting material, the method including the step of causing or allowing the material to cure.

Preferably the method comprises a method of compression moulding.

Preferably the pressure and temperature and cycle time are chosen so that the sheet-form material sets in the mould.

Preferably the mould is profiled to produce the desired shape of skin.

A contoured surface of the composite product can be obtained. For example the surface of the product may include depressions formed during the pressing step as the components are pressed onto the mould. Thus moulded composite products can be formed.

It is envisaged that the methods of the present invention can be used to form products having no surface mouldings, for example flat panels. In this case, the substrate may comprise any suitable material. Preferably the substrate comprises a rigid material so that the pressing step can be carried out most successfully and the substrate can provide desired mechanical properties to the product. Such a method may for example be used to form flat-fronted panels or doors as well as other articles, for example table tops and kitchen worktops.

In some examples, where a contoured surface is required, the required contours or mouldings can be formed on the surface of the substrate. For example, the required shape may be formed in the substrate by machining, for example, a substrate block comprising polyurethane foam.

The shape of the mould is matched to the contours of the substrate so that when the components are pressed onto the mould surface, the resulting panel has the skin having the required contours bonded to the shaped substrate.

Preferably the substrate comprises a crushable material such that, during the application of pressure step, a surface of the substrate is moulded.

The substrate may comprise more than one material, for example the substrate may comprise regions of different materials or materials having different mechanical properties.

The substrate may comprise a frangible material. Such a material may be rigid and non-crushable in the normal use of the resulting product, but during the pressing step, the substrate material can be crushed to mould the substrate. Where a mould surface is used, the substrate material can be crushed so that its surfaces facing the mould conform to the contours of the mould surface.

This method is particularly advantageous in some examples. In particular, it can remove the requirement to machine the required contours into a surface of the substrate before the application of the skin.

Simple blocks of the substrate can be used in the method to form shaped or moulded products.

The moulding may provide surface contours of the product, and/or may provide the shape of the product itself. It is envisaged that shaped products could be formed using this method.

In examples described, the substrate comprises a plastics material, but other any other suitable material could be used.

It is envisaged that the invention might be applied where the substrate comprises a material which is rigid even on the application of pressure, but preferably the substrate comprises a material which can be controllably crushed during application of pressure so that a surface of the substrate can take on the contours of a part of the mould.

In this way, moulded laminated products can be efficiently produced in a single step from a sheet moulding material and a block of substrate material.

In examples of the present invention, the substrate material preferably comprises a rigid foam, for example a foam material obtained by causing or allowing a mixture of phenolic resole, acid hardener and finely divided particulate solid to cure under conditions in which foaming for the mixture is caused primarily or solely by volatilisation of small molecules present in the resole or formed as a by-product of the curing reaction. The formation of an example of such foams is described in detail in EP 0010353 and foamed bodies comprising these foams can be obtained as ACELL foam from Acell Holdings Limited, UK.

Preferably the substrate material has a density in the range of 100 to 500 kg/m3, more preferably 120 to 400 kg/m3 and most preferably 120 to 250 kg/m3. It has been found that such foams can be caused to reproduce on a face thereof the detail of even quite fine and complex mould surfaces by the application of a suitable pressure the level of which depends on the nature and density of the foam material but can readily be determined by simple experiment.

Such a substrate has a substantially open-cell structure so that as the layer of sheet-form material is pressed into the cells or pores of the material, the gas or vapour therein can be readily displaced.

While any suitable material may be employed, aspects of the invention are particularly suitable for use with substantially rigid structural materials, for example foams, that is, preferably self-supporting foams which are resistant to deflection under load and do not collapse under moderate pressure. The physical properties of such foams, especially the compressive strength and deflection under load are believed to be related to (amongst other factors) cell wall thickness. In some examples, the cell size for suitable substrate material is found to be in the range of about 0.5 mm to 5 mm, more preferably 0.5 or 1 mm to 2 or 3 mm.

It is preferred for the substrate to include a filler material, for example a finely divided filler material. Foamed phenolic resin reinforced with a finely divided filler is particularly preferred in some arrangements because of the excellent combination of physical properties and fire resistance that can be obtained for laminates formed from it.

Preferably at least some of the cells or pores of the foamed substrate are open to the surface of the face on which the layer of sheet-form material is to be applied, and preferably the open out below the surface to a greater width than the opening, thereby providing an undercut which can enhance the keying of the layer material to the substrate.

In some examples, the thickness of the layer of sheet-form material provided on the substrate will be at least 1 mm but thicknesses of less than 1 mm are also contemplated. If desired, the thickness of the layer of material may be reduced before or after setting.

In some examples a further layer of sheet-form material is applied to an opposing surface of the substrate, the application of pressure sandwiching the substrate between the two layers of sheet-form material. In this case, a further veneer layer or other layer may or may not be provided on the surface of the other layer of sheet-form material.

In this way, a laminate product including a skin on two sides can be formed. For example, were the product comprises a door, both sides of the door can be formed in a single step.

The sheet form material preferably includes a thermoset. The material may include further components, for example components to enable the material to be handled in sheet-form.

The sheet-form material of aspects of the invention, may include any appropriate matrix composition. For example, the matrix may include one or more of a thermosetting polymer, for example an epoxy resin, a phenolic resin, a bismaleimide or polyimide, and/or any other suitable material. The material may include melamine, which is useful as a fire retardant. The matrix materials may further include hardeners, accelerators, fillers, pigments, and/or any other components as required. The matrix may include a thermoplastic material.

The sheet-form material may comprise reinforcement, for example reinforcing fibres. The sheet-form material may include glass fibres.

Preferably the layer of sheet-form material comprises SMC (sheet moulding compound).

The SMC may comprise two main components: a matrix and a reinforcement.

The matrix preferably comprises a resin which preferably includes polyester, but may include vinyl ester, epoxy, phenolic, or a polyimide. Preferably the matrix comprises a thermosetting resin.

The matrix may further comprise additives, for example minerals, inert fillers, pigments, stabilizers, inhibitors, release agents, catalysts, thickeners, hydrating additives and/or other suitable materials.

The reinforcement preferably comprises glass fibres. The fibres may be cut, for example into lengths of 5 cm or less, or may be continuous. Other reinforcement materials could be used, for example carbon fibres.

There are benefits in using SMC. For example, SMC has low density but favourable mechanical properties compared with other materials for example thermoplastics and also exhibits good thermal properties. Of particular importance for some applications, for example building applications, resistance to fire is good. SMC also shows good noise reduction qualities, also important where used as a building material and good chemical resistance.

The fibres may be short fibres, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular, and may comprise a fabric, mat, felt or woven or other arrangement. The material may include short fibres. Fibres may provide a continuous filament winding. More than one layer of fibres may be provided.

The fibres may include one or more materials. For example the fibres may include one or more of carbon fibres, glass fibres, aramid fibres and/or polyethylene fibres. Kevlar (RTM) fibres may be used. Products including such fibres could be used for protective devices and building products. For example, some products of the present invention may find application as armoured or bullet-proof products. For example, protective panels may be formed having Kevlar (RTM) fibre reinforcement.

The sheet-form material may comprise an impregnated fibre composite material.

Surprisingly, it has been found that sheet-form materials including long fibres can be used in the methods of the present invention, and also sheet-form materials including fibres which are woven together can be used. Without wishing to be bound by theory, it is thought that such materials having relatively long fibre reinforcements and/or including fibre mats or other networks or structures can be used because the movement of material in the mould in a direction along the mould surface is relatively low.

Alternatively or in addition to reinforcement being provided as an integral part of the sheet-form material, reinforcement may be provided as a separate layer, for example arranged between the sheet-form material and the substrate.

Where the separate layer of reinforcement is provided, it may be located across the whole of the substrate, or may for example be provided in only parts. For example, if there is a particular section of the product which is more susceptible to damage or attack, additional reinforcement can be provided in that region. For example, where the product is to be used in a door, additional reinforcement may be provided at regions of the door which are thinner than others for due to decorative moulding or other features and/or at regions of the door which are more susceptible to damage.

Thus the arrangement may include sheet-form material having integral reinforcement, for example short fibres and/or longer fibres which may be arranged as fabrics or mats, for example. In addition, or alternatively, reinforcement may be provided as one or more layers separate from the sheet-form material. The additional layer of reinforcement may include short and/or long fibres, for example of materials mentioned above.

During the pressing or moulding, preferably the matrix material, for example resin, flows into the structure of the fabric or other arrangement, to form a bond.

Preferably the layer of sheet-form material comprises a curable composition. In some examples of the invention, the sheet-form material might be settable other than by curing.

Preferably the pressure and heat is chosen such that the sheet-form material is moulded and then sets in the mould.

Preferably the viscosity of the sheet-form material is reduced during the pressing step.

Preferably the sheet-form material is one that reduces in viscosity and or at least partially liquefies on the application of heat and/or pressure. In this way, some flow of the material in the mould can be achieved. This can lead to improved moulding of the material, more uniform thickness and/or reduction of moulding defects. Preferably, the material at least partly flows into cells of the substrate material during the pressing step. Preferably the material and substrate are such that the material only partly flows into the substrate during the moulding step so that good bonding between the skin and the substrate is obtained while retaining a suitable skin thickness for the required mechanical and other properties of the laminate.

Preferably the sheet-form material is applied as a single thickness.

Preferably the material, for example the SMC is applied to the mould in unfolded form. This leads to ease of manufacture, and also can reduce the pressure required for the moulding step. As discussed further herein, a plurality of single thickness layers may be provided, the layers preferably overlapping at the edges to reduce the risk of gaps being formed in the skin.

Preferably the sheet-form material is applied to substantially a whole mould surface.

Having the SMC extend substantially across the full area of a mould face has a number of advantages. For example, in some arrangements, the pressure required to complete the moulding step can be reduced by reducing the amount of lateral flow required of the material in the mould. Also, by reducing the amount of flow of material across the mould surface, abrasion and/or wear of the surface of the mould can be reduced. In this way, the material used for the mould can be selected from a wider range of candidate materials as discussed in more detail below.

The sheet-form material can be applied to the mould as a single piece of material.

Preferably a plurality of sheets of sheet-form material is applied to a mould surface.

In some arrangements, for example because the mould surface is large, or to improve the ease of handling the sheet-form material, several pieces of sheet-form material can be applied to the mould and/or the substrate. Preferably an edge of one sheet overlaps with an edge of an adjacent sheet. In this way, the risk of gaps being formed in the skin on the substrate is reduced. The additional material at the overlapping region has been found not to lead to reduced quality of the finished product: any excess material in that region can, in some examples, into the substrate and/or laterally within the mould.

Thus in some examples, in particular where complex shapes are to be formed, several pieces of sheet-form material can be provided.

This feature is further advantageous because it can lead to a reduction in the amount of potentially waste sheet-form material. Smaller pieces of material, for example off cuts from larger pieces or cut outs (for example if a panel is to include a glazed section) need not be disposed of but can be used.

Preferably the pressure applied is pressure is less than 200 tonnes, preferably less than about 100 tonnes.

As discussed above, traditional SMC manufacturing processes requires enormous pressure to evacuate the air trapped during the forming of the SMC product. By putting the foam substrate behind the SMC skin prior to pressing, the air can escape though the cellular structure of the foam reducing greatly the abrasion on the tool surface. Also considerably lower pressures are required. Preferably the pressure is less than 500 tonnes, preferably less than 200 tonnes, preferably less than about 100 tonnes.

Preferably the sheet-form material is applied to a mould surface comprising aluminium or aluminium alloy.

Where lower pressures are used, aluminium tools can be used. This can give rise to low cost tooling, flexible production and less downtime due to tool change over in view of the reduced weight of an aluminium mould and speed of heating or cooling an aluminium mould compared with a stainless steel mould. For example, the volume of an aluminium tool could be significantly smaller than that of a corresponding tool of steel, and this combined with the lower density of aluminium leads to considerable weight advantages when using aluminium moulds.

Where reference is made herein to components being made of or comprising aluminium, preferably the relevant component includes aluminium or an appropriate aluminium alloy or other material including aluminium.

The substrate may include surface formations on at least a part of the substrate surface, so that the material of the sheet-form material keys with the formations to bond the material to the substrate.

According to a broad aspect of the invention there is provided a method of forming a laminate product, the method comprising the steps of: providing a sheet-form curable material; providing a substrate; providing a veneer; and pressing the sheet-form material between the substrate and the veneer to form the laminate product.

Preferably the sheet-form material includes a thermoset material.

Preferably the surface of the substrate includes a plurality of pores or other surface formations so that the sheet-form material can flow so as to key mechanically to the substrate, for example as a result of the pores or formations. In this way, a strong interface between the skin and substrate of the resulting product can be achieved.

In some examples the substrate has a substantially open cell structure. The substrate may comprise an open cell foam material.

Preferably a single pressing step is used in the forming of the composite product. Preferably the complete finished product is formed by a method in which only one pressing or moulding step is used.

Preferably the substrate comprises a rigid crushable material. In this way, depressed regions in the laminate product can be formed by using a shaped moulding tool. Preferably the sheet-form material is provided on a surface of the tool, the substrate is provided on the sheet-form layer, and is pressed onto the tool surface.

The method may include the step of providing further components between the two layers being pressed together.

Other components may also be sandwiched between the skins during the moulding process. For example where the product is a door, the doorframe components, glazing panels and other components might be arranged in the mould so that they can be formed into the product in a single moulding step. It is envisaged that a substantially complete product, for example a door, could be made in a single moulding operation using the present invention.

A broad aspect of the invention provides, a method of forming a laminated product, for example a panel or door, the method comprising the steps of providing first and second veneers, providing first and second layers of sheet-form material between the veneers, applying a substrate between the first and second layers of sheet-form material, optionally further applying an additional component between the first and second layers of material, and applying pressure to the layers to bond the layers to the substrate to form the product.

To give improved rigidity, in the finished product (door, window or panel), in general the skins will be spaced not only by a core but also by a frame or frame members such as stiles, rails, and/or mullions. The frame members may be of wood, metal (for example, aluminium) or plastics (such as uPVC) or a combination of these, e.g. metal-reinforced plastics. The plastics material may contain filler, if desired, to improve hardness and/or rigidity.

In a preferred embodiment, the core occupies substantially the entire volume or volumes within the frame; i.e. substantially the whole space within the panel defined by the skins and the components of the frame. It is also preferred that the substrate is bonded to each skin over substantially the entire area of the substrate which is in contact with that skin, even when the skin includes one or more depressed zones, since this enhances the overall strength of the panel and the resistance to bowing.

In one preferred embodiment, the substrate is in the form of one or more blocks, for example rectangular blocks, held in a frame, at least one of the skins includes one or more depressed zones and the portion of the block or blocks behind each said zone conforms to the contours of said zone as a result of selective controlled crushing of the substrate in the area behind said zone.

The veneer layer may include more than one veneer elements. For example, the method may include the step of placing a plurality of veneer elements in the mould, applying SMC over the veneer elements, positioning the substrate on the SMC layer and compression moulding the layers to form the laminate product.

The flow of the SMC material into the surface of the veneer, and the subsequent curing can form a laminate product in which the separate elements of the veneer are rigidly bonded onto the surface of the cured SMC layer in the desired arrangement. This feature can be advantageous, for example because it allows smaller, and cheaper, elements of veneer to be used. Also, more complex shapes might be formed using elements of veneer, for example veneer might be applied around a corner of the laminate product as discussed below.

The elements may all have the same composition, for example may include the same wood, it is envisaged that different materials for example woods, might be placed together as a veneer layer. Thus a panelled or marquetry effects can be obtained.

The invention also provides a product formed by a method as described herein and an apparatus for use in a method as described herein.

Also provided by the invention is a product comprising a substrate and a skin of sheet form material bonded to a surface of the substrate, and further including a veneer bonded to a surface of the skin of sheet-form material.

Preferably the veneer comprises wood.

Preferably the material of the sheet-form material is mechanically keyed with the surface of the substrate and/or with the surface of the veneer.

The substrate may have formations on its surface, the material keying with the formations. The substrate may be substantially open-celled the material extending into cells of the open-cell substrate.

The veneer may have formations on its surface, the material keyed with the surface of the formations. The veneer may be an at least partially porous material, the material extending into the surface of the veneer. For example where the veneer comprises wood, the material extends into the wood between the fibres of the wood material.

There may be a bonding agent between the veneer and the sheet-form material. This may enhance bonding of the layers together.

Preferably the thickness of the veneer is less than 10 mm, preferably less than 5 mm, for example 3 mm or less.

A further aspect of the invention provides a laminate comprising a layer of sheet-form material (for example SMC), and further including a veneer bonded to a surface of the sheet-form material.

Such a laminate product may have one or more of the further features described herein.

The laminate product so formed may be used as a skin in the formation of a door, panel or other article.

For example, two such laminate products can be used as outer skins for a door. The skins are secured to opposite sides of a frame, prior to injecting a foam into a cavity located between the skins. The foam acts as a filler and provides increased rigidity and insulation in the door. Alternatively, one or more of the skins can be bonded to a preformed substrate by any appropriate method.

Where reference is made herein to for example the veneer, skin, layer or substrate being bonded to another element, it is to be understood that, preferably, at least a part of the veneer, skin, layer or substrate is so bonded. In some examples, the veneer, skin or layer or substrate will be attached over the whole of its interface with the other element.

Simulated Surface Effect

Panels and other elements used in building have traditionally been made of natural materials. For example, doors and panels for buildings and furniture have traditionally been made from wood. Other walls and panels have been made of brick or stone. However, there is trend for building elements and other products which would traditionally have used natural products to be made from "non-natural" or synthetic products, for example plastics materials. Such modern materials have many chemical, physical and cost advantages compared with traditional materials. Foam resin laminate panels of the kind comprising a foam resin layer and a polymer skin are being employed increasingly in the building, decorating and furniture industries because of the wide range of useful properties achievable.

Such modern materials have a different appearance from the traditional materials, and much effort is often taken so that the artificial product resemble closely the visual appearance of the traditional product, for example by the application of surface coatings or treatments.

However, even in products where the visual appearance of the surface very closely resembles the traditional material, it is often the case that touching the surface will easily identify that the traditional material has not been used as the feel of the artificial surface does not match that of the traditional surface. This can be the case in particular (but not exclusively) for stone or marble surfaces which, when simulated in polymer materials, feel warm to the touch compared with genuine stone and marble which is cold to the touch.

An object of aspects of the present invention is to solve or mitigate the above identified problems and/or other problems and/or to provide an improved composite product and method of forming a composite product.

According to an aspect of the invention, there is provided a method of forming a skin having a simulated surface effect, the method comprising: providing a mould surface, providing a surface effect material in the mould, applying a sheet-form material to the mould, the sheet-form material covering surface effect material in the mould, and pressing the sheet-form material to the mould surface to form a skin having the surface effect material bonded in its surface.

In this way, the surface effect material can become embedded in the skin in the moulding operation.

Preferably the skin is a polymer skin. Preferably the sheet-form material comprises curable material, preferably a thermosetting material. The sheet-form material may comprise a prepolymer, moulding material or other appropriate material. Such material preferably forms a polymer matrix in the skin formed.

Depending on the materials used and the manner of pressing the components together, the surface effect material may extend from the surface of the skin, or may be substantially embedded or submerged in the surface.

The method may further include the step of carrying out a surface treatment to increase exposure of the surface effect material in the surface. The surface treatment may include removing surface material or matrix from around the surface effect material. The method may further include the step of sandblasting the surface containing the surface effect material. The term sandblasting should preferably be understood to include any technique in which particles are propelled onto the surface to remove part of the matrix material and thus to expose the surface effect material in the surface. Any appropriate method may be used. The sand blasting may be carried out for example by air blasting sand particles at the surface.

Thus the surface formed has a matrix, for example a polymer matrix, and also includes surface effect material.

Preferably the surface effect material has a high thermal conductivity. Preferably the surface effect material has a thermal conductivity which is greater than that of the surrounding matrix, for example a polymer matrix.

One common problem with simulated surfaces is that while the appearance of the surface may be similar to that of the "natural" surface, for example stone or marble, when the surface is touched, it is apparent that the surface is not the natural surface. This is, at least in part, because while a stone or marble surface would usually feel cold to the touch, a surface having a polymer skin is generally warm or neutral to the touch. By providing a component in the surface having a higher thermal conductivity, the overall thermal conductivity of the surface can be increased, and thus the surface of the material feels colder to the touch.

Preferably the bulk thermal conductivity of the surface including the surface effect material is similar to that of the material being simulated, for example marble, sandstone or slate, but even some change to the apparent temperature of the surface would be beneficial.

Preferably the surface effect material is such that the inclusion of the surface effect material in the skin increases the thermal conductivity of the surface of the skin. Preferably the surface effect material is such that the surface of the skin feels cool to the touch.

Preferably the thermal conductivity of the surface effect material is greater than 50, preferably greater than 100, preferably greater than 200 Wm−1 K−1. The threshold for the desired thermal conductivity will depend at least in part on the form in which the surface effect material is present in the surface, but a high inherent thermal conductivity is generally thought to be preferred.

The surface effect material may include a carbon-containing material, for example graphite.

The graphite may be in any appropriate form for use in the methods of the present invention. For example the surface effect material may comprise graphite in particulate form and/or graphite as graphite foam. Other forms of carbon may be used individually or in combination with other components as the surface effect material. For example, the surface effect material may include carbon black in particulate form, or carbon black paste. Carbon nanotubes may be included in the surface effect material. Many forms of carbon have high thermal conductivity. The effective thermal conductivity of graphite in particulate form may be of the order of 200 Wm−1 K−1, or even higher.

Alternatively, or in addition, other materials could be used. The surface effect material may include a metallic material, for example a metallic powder, for example including aluminium.

Where stone, slate, marble or similar natural product is to be simulated, particles of the natural material being simulated may be included in the surface effect material. For example, where a slate surface is to be simulated, powdered slate may be used as the surface effect material.

In preferred examples the surface effect material is applied in the form of particles, for example a powder, to the mould.

Alternatively, or in addition, the surface effect material may include, for example a layer of material which is applied to the mould. For example, the surface effect material may comprise a sheet of material or fabric including material having a high thermal conductivity, for example a mat or mesh of material including fibres having high thermal conductivity and/or particulate material or coating applied to the material. While a dry composition for the surface effect material is preferred for ease of processing, a wet composition might be used, for example comprising the surface effect material in a curable resin. Such a resin might be for example spread or sprayed onto the mould, or applied in any other appropriate way.

Preferably, the amount of surface effect material added is such that the desired properties are obtained. For example, the surface effect material might be added in an amount of less than 10%, less than 5%, preferably less than 3% by weight based on the weight of the sheet-form material.

Preferably the surface effect material is spread onto the mould surface in the form of a loose powder.

The method may include a step of preparing the surface effect material prior to application on the mould to separate aggregations or clusters of particles, for example which might form clusters in the surface of the skin.

The sheet-form material preferably covers substantially all of the surface area of the mould. Preferably there is substantially no spreading of the sheet-form material in a direction along the mould surface during the pressing step. Such movement or spreading along the mould surface is undesirable in some applications, in particular where it would move the surface effect material dusted onto the mould surface, leading to uneven and/or undesirable distribution of the surface effect material in the skin.

By providing the matrix in the form of a sheet, the use of liquid resin can be avoided. This can give considerable time savings in the manufacture of the product, as well as benefits regarding the ease of use of the matrix material and a reduction in the manpower and equipment required to apply the matrix material or pre-polymer to the mould.

The method may include the step of applying a protective layer between the surface effect material and the sheet-form material to reduce the movement of surface effect material during the pressing step. For example, the protective layer may include a mesh or veil or fabric or other material. Preferably any such protective layer is porous to at least a component of the sheet-form material during the pressing step, for example so that the curable material can flow through the protective layer and around the surface effect material.

The method may include the step of heating the mould surface prior to the pressing step. The heating of the mould may improve flow of the sheet-form material and improve the bonding of the surface effect material in the curable material. The mould temperature may be for example greater than 100 degrees C., for example 140 degrees C.

The sheet-form material preferably comprises a sheet moulding compound (SMC). The SMC preferably includes a thermosetting polymer and reinforcing element, for example fibres. For example, the SMC may include a thermosetting resin, for example a polyester resin, together with reinforcing fibres, for example glass fibres. During the pressing or moulding step, the resin of the SMC material flows within the mould cavity, encapsulating the surface effect material, and then cures forming the skin including the surface effect material within its surface.

The sheet-form material may, for example comprise a resin impregnated fibre composite. For example, the sheet-form material may comprise a fibre mat or fabric impregnated with a curable material. For example, the fibres may comprise glass fibres.

The skins formed may be used to face substrates to provide a simulated surface. For example, where the skins are intended to simulate stone, the skins may be bonded to a panel element to form stone-faced panels. Bonding may include chemical and/or physical bonding elements, for example adhesive and/or fixing elements for example screws and bolts.

The method may further include the step of providing a substrate, the skin being bonded to the substrate during the pressing step. Thus the substrate may be included in the mould cavity so that the curable material can be bonded and cured on the substrate. Bonding agents, for example adhesives, can be used to improve the bond.

The substrate may include surface formations for keying with the moulding material. This can improve the bond between the substrate and the curable material in the sheet-form material.

In some examples of the method, a substrate is arranged adjacent the sheet-form material during the pressing step, the substrate being such that gas or vapour can escape from the pressing region during the pressing step. Air trapped in the mould cavity and gases formed during the during reaction need to be released during the moulding operation. Preferably the pressing region is that area where the surface of the substrate and the sheet-form material are being pressed together, preferably in the region of the interface of the substrate and the material.

By removing gas or vapour that might otherwise remain and/or build up in that region, the pressure required to form the composite product can be significantly reduced in some examples. Preferably a region at least a part of the surface of the material is porous to allow for the displacement of gas or vapour form the relevant areas.

Preferably the substrate is such that gas or vapour can escape from the pressing region in a direction having at least a component in a direction generally transverse to the pressing direction in which the sheet-form material is pressed to the substrate.

Other formations (as an alternative or in addition) may be provided to assist the displacement of the gas. For example, grooves or channels could be formed in the substrate.

The configuration of the substrate which allows for the displacement of the gas may be inherent in that it arises from the nature of the composition of the substrate itself, and/or it may be provided by subsequent action, for example by machining the substrate or by chemical action on the substrate. Preferably the configuration of the substrate is such that it can release pressure in the pressing region.

Preferably the substrate includes a material having a cellular structure.

A cellular structure of the substrate can provide the necessary displacement of the gases in some arrangements. In preferred examples, the substrate comprises a material including a substantially open-celled structure. In this way, good movement of the gases away from the pressing region can be obtained in some examples. The substrate may comprise a foam material.

The substrate may comprise a foam material including a substantially open-celled structure. It is envisaged that the substrate might not form part of the ultimate product being formed. For example after the pressing step, the substrate may be removed from the skin.

In many cases, however, the substrate is a part of the formed laminate product and becomes bonded to the curable material during the pressing. Preferably the curable material extends into the surface of the substrate during the formation of the laminate so as to improve the mechanical bonding between the components. Alternatively, or in addition, an adhesive or other bonding agent may be used between the substrate and sheet-form material.

By applying a sheet-form material to a substrate comprising an open-celled structure, several advantages can be achieved. In particular, by using an open cell foam substrate, air in the mould and gases produced during the moulding process can pass into and through the open cell structure of the foam so that the risk of the air and gases leading to flaws and other deformities in the skin are reduced.

Furthermore, by bonding the sheet-form material to the substrate in the moulding process, efficiencies in manufacture of the laminate product can be achieved since in some examples, a further step to adhere the layers together might be avoided. In preferred examples, the material of the sheet-form material passes into the cells or other formations of the substrate material during the moulding process and provides a mechanical bond between the substrate and the moulded skin. This can reduce the risk of delamination of the skin from the substrate core, provide a stable product when exposed to heating/cooling cycles and provides a monolithic composite structure without the need for an adhesive to be applied or the assembly of parts.

In preferred examples, the sheet-form material forms a skin on the substrate, which is mechanically keyed into substrate giving a good bond between the skin and the substrate. In some cases it has been found that the bond achieved at the interface of the skin and the substrate is in fact stronger then the material of the substrate itself. A laminate product made by this method may fail within the substrate layer, and not at the interface.

The sheet-form material may include a sheet moulding compound (SMC). Preferably the sheet-form material includes a thermosetting polymer, for example a resin, for example a polyester resin, together with reinforcing fibres, for example glass fibres.

The laminate product produced may comprise for example a substrate having one skin of SMC including the surface material, or may comprise a core sandwiched between two skins. Other arrangements are possible. In some cases, for example, the product may comprise a core having a first skin including SMC with the surface effect material, and a second skin including just the SMC layer and no added surface effect material. This arrangement might be preferred where different finishes were required on different surfaces of the product, for example for use as panels or kitchen work surfaces. Alternatively, the simulated stone surface (or other surface effect) may be provided on the other surface. Two-sided simulated panels or other products could be formed. For example a panel might have one type of simulated stone on a first side, and a second type on the other, for example a wood effect surface on the other.

The substrate can form a part of the final product, or it is envisaged that the substrate might be removed, for example by machining, after the skin has been formed. Preferably the substrate forms a part of a final product derived from the composite product.

The core having two skins might be formed in a single pressing operation in which the required layers were arranged and then pressed together in a mould to bond the layers together.

The method may include the step of providing a second layer including a sheet-form material over the substrate, the substrate being sandwiched between the first and second layers of sheet-form material, and pressing the second layer and the substrate together.

The method may further include the step of spreading particles of surface effect material across the second layer of sheet-form material. As above, further layers may be provided between the substrate, sheet-form material, surface effect material, further moulding surfaces, as required. Preferably where other layers are provided, they are such as to allow curable material to flow into and bond with the substrate and/or the surface effect material.

In this way it can be seen how a two-sided panel or other article can be formed in a single pressing operation. Alternatively, two or more steps might be used. A further layer of surface effect material can be provided at the second layer.

In some embodiments of the invention, the sheet-form material is applied directly to the substrate. In other examples, one or more layers may be provided between the substrate and the sheet-form material, for example to enhance adhesion or bonding of the two parts. For example an adhesive might be applied between the parts.

The components will be pressed together between suitable moulds or plates. In preferred examples, at least one mould part is provided which includes a pattern to be taken by the components during the pressing or moulding step.

For example, where the laminate product is to be a panel for a wall, a mould surface might include for example recessed regions and other surface features and textures so that the moulded door might look more realistic compared with a traditional sandstone wall. For example projections simulating the courses of stones may be provided.

In some examples, one or more further layers might be applied between the surface effect material and/or sheet-from material and the tool surface itself. In some examples, materials might be applied to the tool surface, for example to assist moulding and/or release of the product from the mould.

A coating composition may be applied to the mould which forms a coating on the product after moulding. The composition may be coloured. The composition may be applied to the mould in the form of a powder, for example using an electrostatic method.

A sheet or veil may be applied between the sheet-form material and the mould surface. In some examples, it is thought that the use of a veil has the effect of reducing movement of the matrix material in the plane of the mould. It is a preferred feature of the aspects of the present invention that the movement in the plane of the mould surfaces is reduced; it gives better finish to the moulded products in some arrangements.

Preferably the method includes applying heat and pressure to the surface effect material and the sheet-form material. Preferably the sheet-form material is cured directly onto the surface effect material and substrate. Preferably the method comprises a method of compression moulding.

Preferably the pressure and temperature and cycle time are chosen so that the sheet-form material sets or cures in the mould.

Preferably the mould is profiled to produce the desired shape of skin.

It is envisaged that the methods of the present invention can be used to form products having no surface mouldings, for example flat panels. In this case, the substrate may comprise any suitable material. Preferably the substrate comprises a rigid material so that the pressing step can be carried out most successfully and the substrate can provide desired mechanical properties to the product. Such a method may for example be used to form flat-fronted panels or doors as well as other articles, for example table tops and kitchen worktops.

In some examples, where a contoured surface is required, the required contours or mouldings can be formed on the surface of the substrate. For example, the required shape may be formed in the substrate by machining, for example, a substrate block comprising polyurethane foam.

The shape of the mould is matched to the contours of the substrate so that when the components are pressed onto the mould surface, the resulting panel has the skin having the required contours bonded to the shaped substrate.

Preferably the substrate comprises a crushable material such that, during the application of pressure step, a surface of the substrate is moulded.

The substrate may comprise more than one material, for example the substrate may comprise regions of different materials or materials having different mechanical properties.

The substrate may comprise a frangible material. Such a material may be rigid and non-crushable in the normal use of the resulting product, but during the pressing step, the substrate material can be crushed to mould the substrate. Where a mould surface is used, the substrate material can be crushed so that its surfaces facing the mould conform to the contours of the mould surface.

This method is particularly advantageous in some examples. In particular, it can remove the requirement to machine the required contours into a surface of the substrate before the application of the skin.

Simple blocks of the substrate can be used in the method to form shaped or moulded products.

The moulding may provide surface contours of the product, and/or may provide the shape of the product itself. It is envisaged that shaped products could be formed using this method.

In examples described, the substrate comprises a plastics material, but other any other suitable material could be used.

It is envisaged that the invention might be applied where the substrate comprises a material which is rigid even on the application of pressure, but preferably the substrate comprises a material which can be controllably crushed during application of pressure so that a surface of the substrate can take on the contours of a part of the mould.

In this way, moulded laminated products can be efficiently produced in a single step from a sheet-form curable material and a block of substrate material.

In examples of the present invention, the substrate material preferably comprises a rigid foam, for example a foam material obtained by causing or allowing a mixture of phenolic resole, acid hardener and finely divided particulate solid to cure under conditions in which foaming for the mixture is caused primarily or solely by volatilisation of small molecules present in the resole or formed as a by-product of the curing reaction. The formation of an example of such foams is described in detail in EP 0010353 and foamed bodies comprising these foams can be obtained as ACELL foam from Acell Holdings Limited, UK.

Preferably the substrate material has a density in the range of 100 to 500 kg/m3, more preferably 120 to 400 kg/m3 and most preferably 120 to 250 kg/m3. It has been found that such foams can be caused to reproduce on a face thereof the detail of even quite fine and complex mould surfaces by the application of a suitable pressure the level of which depends on the nature and density of the foam material but can readily be determined by simple experiment.

Such a substrate has a substantially open-cell structure so that as the layer of sheet-form material is pressed into the cells or pores of the material, the gas or vapour therein can be readily displaced.

While any suitable material may be employed, aspects of the invention are particularly suitable for use with substantially rigid structural materials, for example foams, that is, preferably self-supporting foams which are resistant to deflection under load and do not collapse under moderate pressure. The physical properties of such foams, especially the compressive strength and deflection under load are believed to be related to (amongst other factors) cell wall thickness. In some examples, the cell size for suitable substrate material is found to be in the range of about 0.5 mm to 5 mm, more preferably 0.5 or 1 mm to 2 or 3 mm.

It is preferred for the substrate to include a filler material, for example a finely divided filler material. Foamed phenolic resin reinforced with a finely divided filler is particularly preferred in some arrangements because of the excellent combination of physical properties and fire resistance that can be obtained for laminates formed from it.

Preferably at least some of the cells or pores of the foamed substrate are open to the surface of the face on which the layer of sheet-form material is to be applied, and preferably the open out below the surface to a greater width than the opening, thereby providing an undercut which can enhance the keying of the layer material to the substrate.

In some examples, the thickness of the layer of sheet-form material provided on the substrate will be at least 1 mm but thicknesses of less than 1 mm are also contemplated. If desired, the thickness of the layer of material may be reduced before or after setting.

In some examples a further layer of sheet-form material is applied to an opposing surface of the substrate, the application of pressure sandwiching the substrate between the two layers of sheet-form material. In this case, a further surface material layer or other layer may or may not be provided on the surface of the other layer of sheet-form material.

In this way, a laminate product including a skin on two sides can be formed. For example, were the product comprises a door, both sides of the door can be formed in a single step.

The sheet form material preferably includes a thermoset. The material may include further components, for example components to enable the material to be handled in sheet-form.

The sheet-form material of aspects of the invention, may include any appropriate matrix composition. For example, the matrix may include one or more of a thermosetting polymer, for example an epoxy resin, a phenolic resin, a bismaleimide or polyimide, and/or any other suitable material. The material may include melamine, which is useful as a fire retardant. The matrix materials may further include hardeners, accelerators, fillers, pigments, and/or any other components as required. The matrix may include a thermoplastic material.

The sheet-form material may comprise reinforcement, for example reinforcing fibres. The sheet-form material may include glass fibres.

Preferably the layer of sheet-form moulding material comprises SMC (sheet moulding compound).

The SMC may comprise two main components: a matrix and a reinforcement.

The matrix preferably comprises a resin which preferably includes polyester, but may include vinyl ester, epoxy, phenolic, or a polyimide. Preferably the matrix comprises a thermosetting resin.

The matrix may further comprise additives, for example minerals, inert fillers, pigments, stabilizers, inhibitors, release agents, catalysts, thickeners, hydrating additives and/or other suitable materials.

The reinforcement preferably comprises glass fibres. The fibres may be cut, for example into lengths of 5 cm or less, or may be continuous. Other reinforcement materials could be used, for example carbon fibres.

There are benefits in using SMC. For example, SMC has low density but favourable mechanical properties compared with other materials for example thermoplastics and also exhibits good thermal properties. Of particular importance for some applications, for example building applications, resistance to fire is good. SMC also shows good noise reduction qualities, also important where used as a building material and good chemical resistance.

The fibres may be short fibres, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular, and may comprise a fabric, mat, felt or woven or other arrangement. The material may include short fibres. Fibres may provide a continuous filament winding. More than one layer of fibres may be provided.

The fibres may include one or more materials. For example the fibres may include one or more of carbon fibres, glass fibres, aramid fibres and/or polyethylene fibres. Kevlar (RTM) fibres may be used. Products including such fibres could be used for protective devices and building products. For example, some products of the present invention may find application as armoured or bullet-proof products. For example, protective panels may be formed having Kevlar (RTM) fibre reinforcement.

The sheet-form material may comprise an impregnated fibre composite material.

Surprisingly, it has been found that sheet-form materials including long fibres can be used in the methods of the present invention, and also sheet-form materials including fibres which are woven together can be used. Without wishing to be bound by theory, it is thought that such materials having relatively long fibre reinforcements and/or including fibre mats or other networks or structures can be used because the movement of material in the mould in a direction along the mould surface is relatively low.

Alternatively or in addition to reinforcement being provided as an integral part of the sheet-form material, reinforcement may be provided as a separate layer, for example arranged between the sheet-form material and the substrate.

Where the separate layer of reinforcement is provided, it may be located across the whole of the substrate, or may for example be provided in only parts. For example, if there is a particular section of the product which is more susceptible to damage or attack, additional reinforcement can be provided in that region. For example, where the product is to be used in a door, additional reinforcement may be provided at regions of the door which are thinner than others for due to decorative moulding or other features and/or at regions of the door which are more susceptible to damage.

Thus the arrangement may include sheet-form material having integral reinforcement, for example short fibres and/or longer fibres which may be arranged as fabrics or mats, for example. In addition, or alternatively, reinforcement may be provided as one or more layers separate from the sheet-form material. The additional layer of reinforcement may include short and/or long fibres, for example of materials mentioned above.

During the pressing or moulding, preferably the matrix material, for example resin, flows into the structure of the fabric or other arrangement, to form a bond.

Preferably the layer of sheet-form material comprises a curable composition. In some examples of the invention, the sheet-form material might be settable other than by curing.

Preferably the pressure and heat is chosen such that the sheet-form material is moulded and then sets in the mould.

Preferably the viscosity of the sheet-form material is reduced during the pressing step.

Preferably the sheet-form material is one that reduces in viscosity and or at least partially liquefies on the application of heat and/or pressure. In this way, some flow of the material in the mould can be achieved. This can lead to improved moulding of the material, more uniform thickness and/or reduction of moulding defects. Preferably, the material at least partly flows into cells of the substrate material during the pressing step. Preferably the material and substrate are such that the material only partly flows into the substrate during the moulding step so that good bonding between the skin and the substrate is obtained while retaining a suitable skin thickness for the required mechanical and other properties of the laminate.

Preferably the sheet-form material is applied as a single thickness.

Preferably the material, for example the SMC is applied to the mould in unfolded form. This leads to ease of manufacture, and also can reduce the pressure required for the moulding step. A plurality of single thickness layers may be provided, the layers preferably overlapping at the edges to reduce the risk of gaps being formed in the skin.

Preferably the sheet-form material is applied to substantially a whole mould surface.

Having the SMC extend substantially across the full area of a mould face has a number of advantages. For example, in some arrangements, the pressure required to complete the moulding step can be reduced by reducing the amount of lateral flow required of the material in the mould. Also, by reducing the amount of flow of material across the mould surface, abrasion and/or wear of the surface of the mould can be reduced. In this way, the material used for the mould can be selected from a wider range of candidate materials as discussed in more detail below.

The sheet-form material can be applied to the mould as a single piece of material.

Preferably a plurality of sheets of sheet-form material is applied to a mould surface.

In some arrangements, for example because the mould surface is large, or to improve the ease of handling the sheet-form material, several pieces of sheet-form material can be applied to the mould and/or the substrate. Preferably an edge of one sheet overlaps with an edge of an adjacent sheet. In this way, the risk of gaps being formed in the skin on the substrate is reduced. The additional material at the overlapping region has been found not to lead to reduced quality of the finished product: any excess material in that region can, in some examples, into the substrate and/or laterally within the mould.

Thus in some examples, in particular where complex shapes are to be formed, several pieces of sheet-form material can be provided.

This feature is further advantageous because it can lead to a reduction in the amount of potentially waste sheet-form material. Smaller pieces of material, for example off cuts from larger pieces or cut outs (for example if a panel is to include a glazed section) need not be disposed of but can be used.

Preferably the pressure applied is pressure is less than 200 tonnes, preferably less than about 100 tonnes.

As discussed above, traditional SMC manufacturing processes requires enormous pressure to evacuate the air trapped during the forming of the SMC product. By putting the foam substrate behind the SMC skin prior to pressing, the air can escape though the cellular structure of the foam reducing greatly the abrasion on the tool surface. Also considerably lower pressures are required. Preferably the pressure is less than 500 tonnes, preferably less than 200 tonnes, preferably less than about 100 tonnes.

Preferably the sheet-form material is applied to a mould surface comprising aluminium or aluminium alloy.

Where lower pressures are used, aluminium tools can be used. This can give rise to low cost tooling, flexible production and less downtime due to tool change over in view of the reduced weight of an aluminium mould and speed of heating or cooling an aluminium mould compared with a stainless steel mould. For example, the volume of an aluminium tool could be significantly smaller than that of a corresponding tool of steel, and this combined with the lower density of aluminium leads to considerable weight advantages when using aluminium moulds.

Where reference is made herein to components being made of or comprising aluminium, preferably the relevant component includes aluminium or an appropriate aluminium alloy or other material including aluminium.

The substrate may include surface formations on at least a part of the substrate surface, so that the material of the sheet-form material keys with the formations to bond the material to the substrate.

The method may include the step of providing further components between the two layers being pressed together.

Other components may also be sandwiched between the skins during the moulding process. For example where the product is a door, the door frame components, glazing panels and other components might be arranged in the mould so that they can be formed into the product in a single moulding step. It is envisaged that a substantially complete product, for example a door, could be made in a single moulding operation using the present invention.

To give improved rigidity, in the finished product (door, window or panel), in general the skins will be spaced not only by a core but also by a frame or frame members such as stiles, rails, and/or mullions. The frame members may be of wood, metal (for example, aluminium) or plastics (such as uPVC) or a combination of these, e.g. metal-reinforced plastics. The plastics material may contain filler, if desired, to improve hardness and/or rigidity.

In a preferred embodiment, the core occupies substantially the entire volume or volumes within the frame; i.e. substantially the whole space within the panel defined by the skins and the components of the frame. It is also preferred that the substrate is bonded to each skin over substantially the entire area of the substrate which is in contact with that skin, even when the skin includes one or more depressed zones, since this enhances the overall strength of the panel and the resistance to bowing.

In one preferred embodiment, the substrate is in the form of one or more blocks, for example rectangular blocks, held in a frame, at least one of the skins includes one or more depressed zones and the portion of the block or blocks behind each said zone conforms to the contours of said zone as a result of selective controlled crushing of the substrate in the area behind said zone.

In a further aspect of the invention there is provided a method of forming a polymer skin having a simulated surface temperature effect, the method comprising providing a precursor polymer in a mould, providing a surface effect material in the mould, and carrying out the moulding so that the surface effect material is incorporated into the polymer skin to give the surface temperature effect.

While there is benefit in the curable prepolymer material to the mould in non-liquid form, in some arrangements liquid resin might be used to form the polymer skin.

In a further aspect of the invention, there is provided a method of forming a polymer skin having a simulated cool surface, the method comprising adding a high conductivity surface effect material to a curable material, and forming the polymer skin.

It is envisaged that the high conductivity material might be provided as a component of the curable composition, in which case a separate application of the surface effect material would not be required.

The invention also provides a product formed by a method as described herein and an apparatus for use in a method as described herein.

Also provided by an aspect of the invention is a skin having a simulated surface effect, the skin comprising a cured polymer layer and surface effect material having a high thermal conductivity embedded in the surface of the cured polymer.

Also provided by the invention is a composite product comprising a substrate and a skin of sheet form material bonded to a surface of the substrate, and further including a surface effect material having a high thermal conductivity embedded in a surface of the skin of sheet-form material.

Preferably the surface effect material includes a carbon-containing material, for example graphite.

Preferably the material of the sheet-form material is mechanically keyed with the surface of the substrate and/or with the surface effect material.

The substrate may have formations on its surface, the material keying with the formations. The substrate may be substantially open-celled the material extending into cells of the open-cell substrate.

Where reference is made herein to for example the skin, layer or substrate being bonded to another element, it is to be understood that, preferably, at least a part of the skin, layer or substrate is so bonded. In some examples, the skin or layer or substrate will be attached over the whole of its interface with the other element.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Preferred features of the present invention will now be described, purely by way of example, with reference to the accompanying drawings, in which.

In a method described in UK Patent Application No. 0719343.6, the skins are bonded directly to a foam core during a moulding step. A layer of sheet-form SMC is provided on the mould surface, a foam core is placed on the layer of SMC, and pressure is applied to mould the components together. During the moulding step, the core and SMC layer are moulded to the desired shape, and the SMC material becomes bonded to the core. The content of that patent application is incorporated herein by reference.

Figure 1:
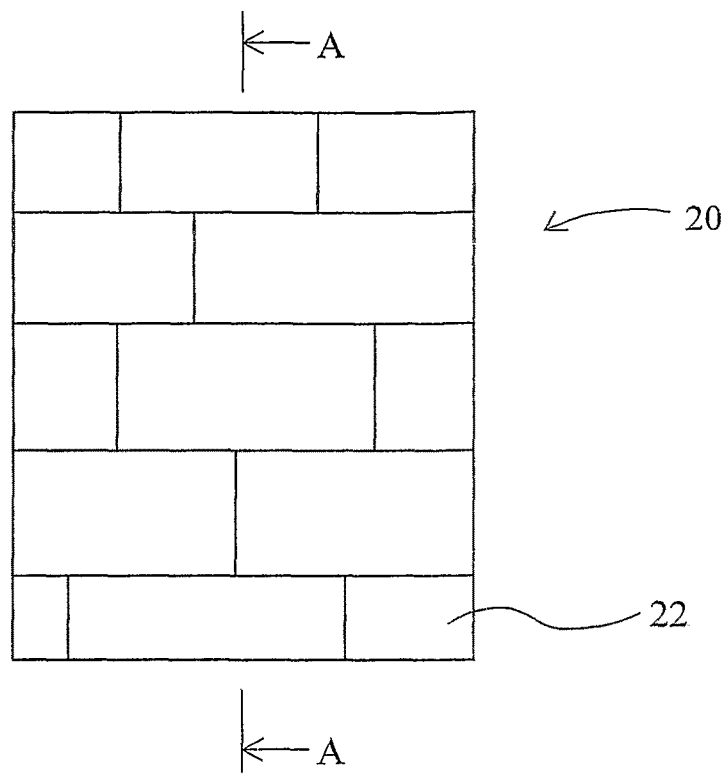
FIG. 1 shows a schematic plan view of a mould used for forming a skin according to an example of the present invention.

FIG. 1 shows schematically a plan view of an aluminium mould 20. The mould comprises a surface contour suitable for moulding a simulated sandstone panel. The moulding surface is rectangular and includes a pattern of projections 22 arranged to emulate the position of gaps between adjacent blocks of a sandstone wall.

The mould is heated to a temperature of approximately 140 degrees C.

Sharp sand is dusted over the surface of the mould to form a granular layer 30.

Figure 2:
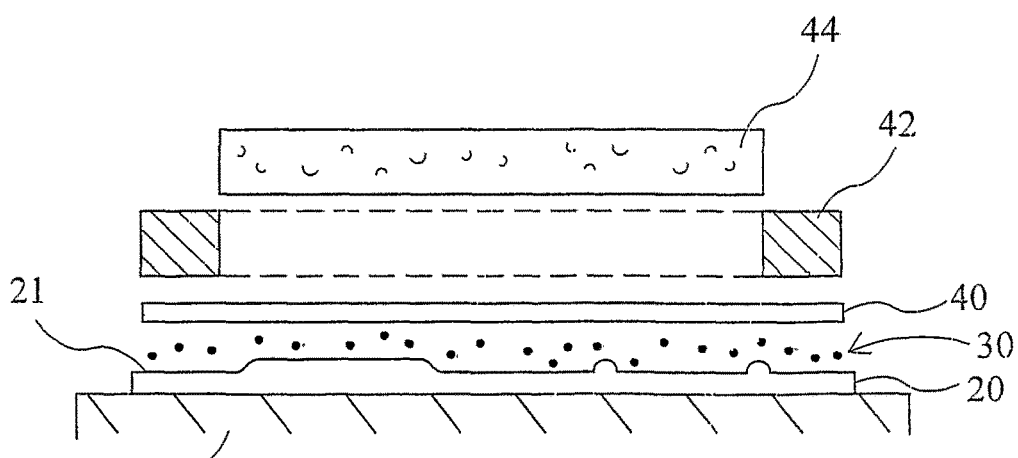
FIG. 2 shows a section taken on A-A of FIG. 1 and showing schematically the components for moulding a laminate product including the simulated stone skin.

As shown in FIG. 2, a sheet of sheet moulding compound 40 is applied to the upper surface of the mould over the granular layer 30. The sheet 40 is sized so as to extend across the whole area of the mould surface 20.

It will be appreciated that in FIG. 2 and in other of the figures the shapes of the components are shown schematically. In particular, the relative thicknesses of the elements are not shown to scale. For example, the preferred thickness of the SMC is about 1 mm whereas the thickness of the substrate is about 5 cm.

Onto the sheet 40 is placed a wooden frame 42 is positioned onto the sheet 40 (FIG. 2) and a block of foam substrate 44 is inserted into the frame 42.

The substrate 44 may comprise a foam, for example as described in more detail below.

Such foam used is advantageously:

structural and has significant load bearing properties frangible and can be formed under pressure and has no memory and therefore substantially retains its pressed form open cell and therefore allows the migration of clues resins into the cells during door manufacture to create a truly monolithic composite structure.

In an example of the foam used, the cell size ranges from 0.5 to 3 mm and the density is 80 to 800 kg/m3.

The block of foam 44 is sized so as to be thicker than the frame so that the upper surface of the foam 44 extends above the frame 42 when the foam 44 is inserted in the aperture of the frame 42.

Figure 3:
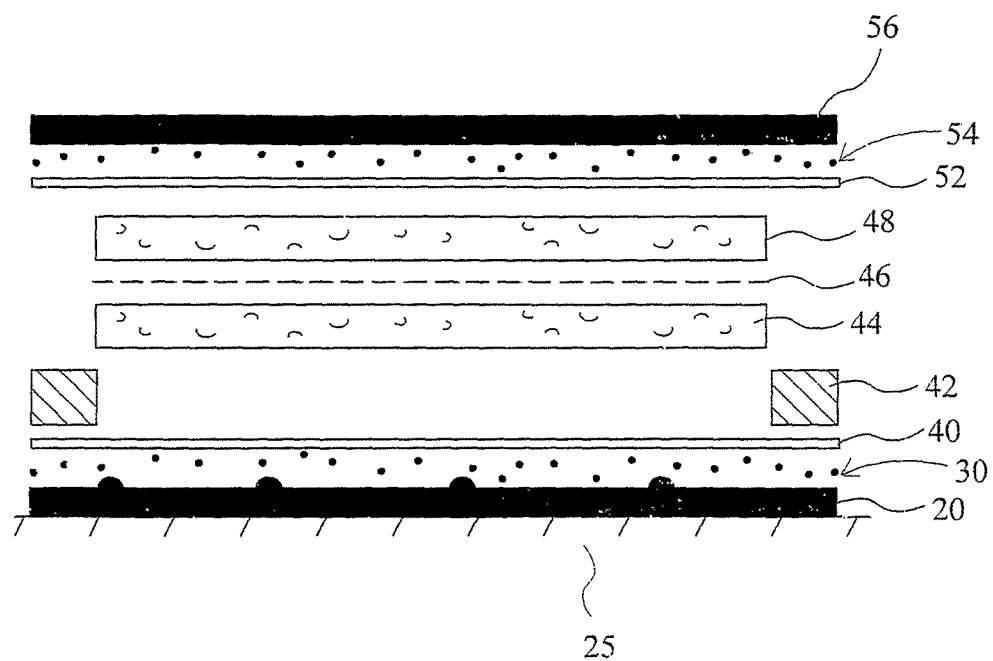
FIG. 3 shows the layers in a method for moulding a wall panel.

Downward pressure of about 100 tonnes is applied to the components (as arranged in FIG. 3) using a pressure plate 50. The substrate 44 is pressed toward the lower moulding surface 20, crushing the foam and moulding the lower surface of the substrate to the shape of the mould surface 20. The SMC sheet 40 is also pressed between the mould surface and the substrate 44. Near the heated mould surface 20, the SMC begins to liquefy and flows into cells at the surface of the substrate 44 as well as around the grains of the sand to encapsulate the sand into its surface.

Air and other gases trapped between the SMC 40 and the substrate 44 passes through the open cell structure of the foam. The components are held in the mould with the application of pressure for a sufficient time for the SMC to cure for form a skin bound to the moulded substrate 44.

The resulting product is removed from the mould. The cycle time for moulding the product may be about 4 minutes.

It is seen that in this example, an upper mould portion is not required. In this example, the components are pressed against a single heated platen.

A moulded panel having a simulated stone surface may be formed in a single pressing step.

A lower mould 20 is provided and placed on a heated platen 25 so that the mould reaches a temperature of about 140 degrees C. The lower moulding surface 21 of the lower mould 20 may be flat or may be contoured as here according to the surface shape of a stone wall.

A layer of granular material 30, here sand is placed onto the moulding surface 21.

A sheet 40 of curable material is applied. The size of the lower sheet 40 is approximately the same as that of the lower moulding surface 21.

A foam block 44 comprising ACELL foam is applied to the upper surface of the lower sheet 40. A wooden frame 42 is placed around the lower foam block. Alternatively, the frame 42 could be applied first, and the block 44 inserted into the frame. A reinforcement sheet 46 comprising a metal grid is placed in the frame 42 onto the lower foam block 44. Onto the reinforcement sheet 46 and within the frame 42 is placed an upper foam block 48 also comprising ACELL foam. A layer of adhesive may be applied between the two blocks 44, 48 to aid bonding. Onto the upper foam block is placed the upper sheet 52 of curable material.

Optionally, onto the upper sheet of curable material 52 is placed further granular material, for example sand 54. In some arrangements, it will be desired for the simulated sandstone surface to be present on both surfaces of the panel. In other arrangements, sandstone on one surface of the door only will be required. In the latter case, it will be appreciated that the granular material may be arranged at the lower or the upper region of the moulded components. In other words, the order of laying down of the components shown in FIG. 3 may be reversed.

An upper mould 56 is provided having an upper moulding surface 58 contoured according to the surface shape of a wall panel or flat as shown here. The upper mould 56 is heated to a temperature of about 140 degrees C.

The upper mould 56 is lowered onto the other components and pressure of about 100 tonnes is applied to press the upper mould 56 towards the lower mould 20.

The upper block 48 and the lower block 44 comprise frangible foam and the surfaces of the blocks facing the adjacent mould surfaces 20 and 58 are crushed and moulded to the surface shape of the wall panel.

The curable material of the upper and lower sheets 40 and 52 flow into the adjacent foam blocks 44, 48 and also around the grains of sand to form a mechanical bond. Curing of the curable material takes place in the heated mould so that the upper and lower sheets 40 and 52 form skins bonded to the upper and lower blocks.

Once cure is complete after a few minutes, the formed panel is released from the mould.

Thus it can be seen how a panel can be made in a single pressing operation.

In an alternative example, the lower block 44, the reinforcement 46 and the upper block 48 are provided as a single unit.

In other arrangements, the mould may be coated with a powder coating which then forms a coating on the product. This feature may be present in relation to any of the aspects of the invention. As an example, a powder coating can be applied electrostatically to the mould surface. Where the mould surface is heated, the powder coating melts or softens almost as soon as it is applied to the surface. For example the powder may include a polyester. The SMC or other matrix material (with or without integral reinforcing material) is then applied over the melted or softened powder coating. The melted or softened powder coating is then "sticky" on the surface of the mould and is thought to reduce movement of the matrix material during the moulding operation, which can in some cases give improved surface finish. In this example, the coating remains on the surface of the product, and provides a surface which is scratch and/or impact resistant. The powder coating can be coloured and thus provide a coloured coating to the product. The powder coating may be transparent or translucent and may have the appearance of a varnish on the surface of the product.

It will be understood that a very wide range of different composite products could be formed using methods as described herein. The application of the present invention is not restricted to the formation of, for example, panels.

Figure 5A:
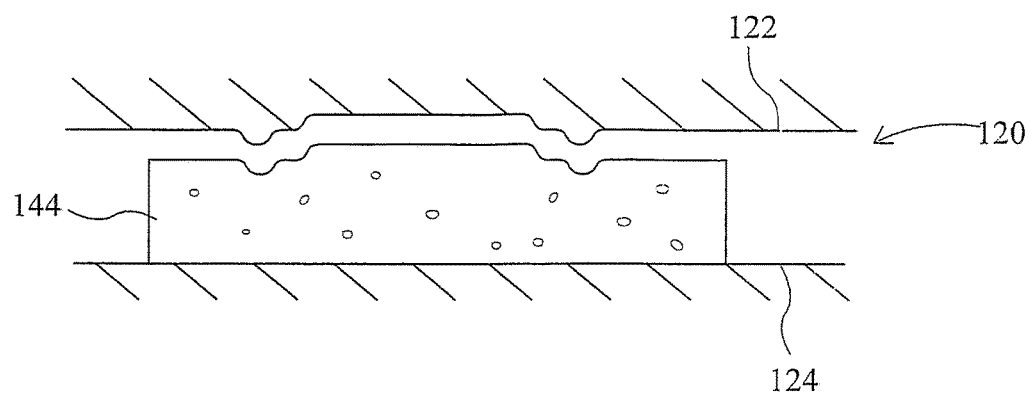
FIGS. 5a to 5c show steps in an example of forming a composite product having a contoured surface.
Figure 5C:
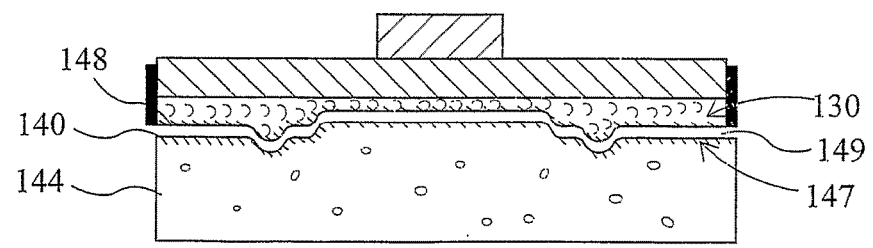
Figure 5B:
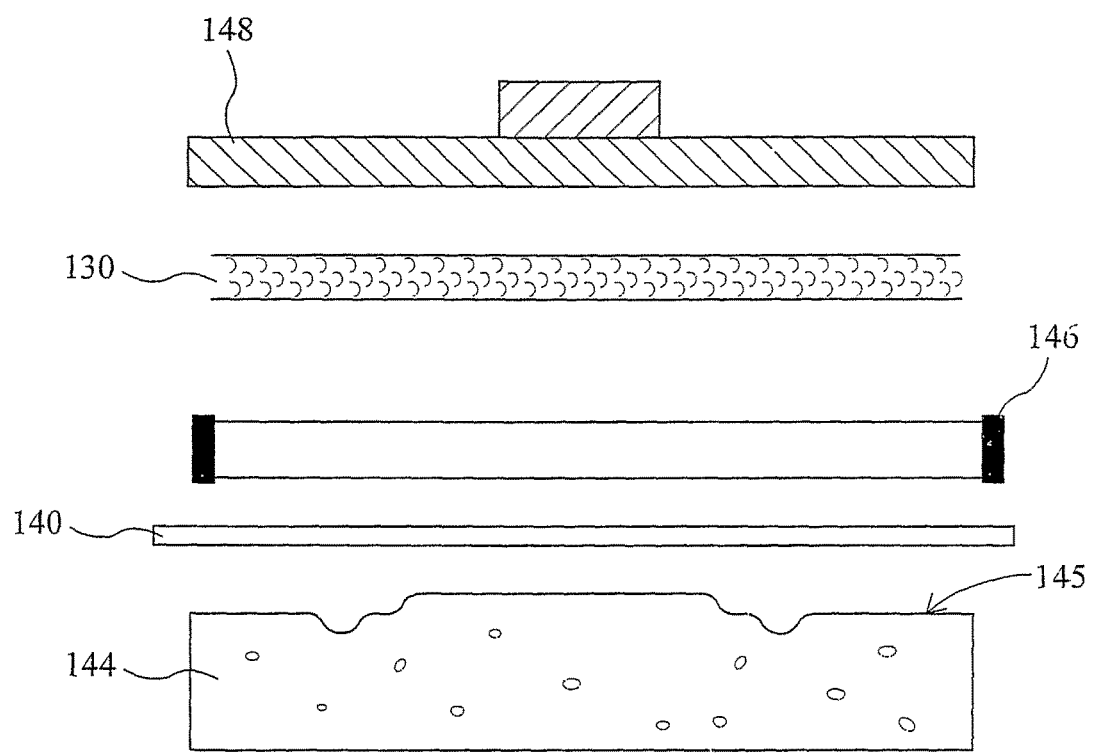

In a further example shown in FIGS. 5a to 5c, a profiled composite panel is formed.

As shown in FIG. 5a, the substrate 144 is first crushed in a cold press 120 to form a profile on a surface of the substrate. The substrate in this example is open-celled ACELL (RTM) foam of Acell Limited. The foam block is placed in the press between two plates 122, 124 of which one has a surface profile to be moulded into the surface of the ACELL foam. As the plates are pressed together, the frangible foam is crushed so that the profile of the plate 122 is formed onto the surface.

It will be appreciated that in other examples, two contoured plates could be used to form a block having more than one profiled surface.

FIG. 5b shows the lay up for the pressing step. The shaped block of foam forms the substrate 144 which is placed at the base of the arrangement. The thickness of the foam is about 40 mm. A sheet of SMC having a thickness of about 3 mm is draped over the contoured surface 145 of the substrate 144.

Onto the upper surface of the SMC sheet 140 is arranged a boundary wall 146 comprising four strips of wood arranged in a generally rectangular configuration to bound the area above the substrate at its perimeter. The wall 146 on the SMC sheet 140 forms a box into which the particulate surface material, in this example sand 130, is filled.

Prior to filling into the box, the sand is heated to a temperature of about 130 degrees C. The sand is poured into the box and leveled. The thickness of the sand is about 10 mm.

A press plate 148 is then used to press the sand 130 down onto the substrate 144. FIG. 5c shows the arrangement during the pressing step. It will be seen that at the substrate/SMC interface 147, the curable material of the SMC has moved into the surface of the substrate to key into the cellular structure to give a strong bond on curing. At the SMC/sand interface 148, some of the sand 130 has become embedded in the polymer skin which, on curing, provides a convincing simulated sandstone surface.

Once the curing is complete or sufficiently complete, the composite product is removed from the press and the sand brushed from the surface to reveal the simulated stone surface on the polymer skin 149 on the surface of the substrate 144.

It has been found that the actual thickness of the sand used is not critical in many applications. The SMC layer will only take up what it needs to form the "sandstone" surface, and the remainder of the sand forms a mould-like element to press the SMC into the substrate 144. It is has been found that in many arrangements, a good "sandstone" surface finish is obtained, even without any further surface treatment, although such finishing treatments could be used if desired.

Variations may be made within the scope of the invention. For example, in some examples, the press arrangement may be provided in reverse formation, with the sand layer at the lower regions, and the substrate above, a pressing plate being provided at the top of the press. In such an arrangement, a lower mould portion comprising a number of regions could be provided. Surfacing material of different types could be provided in different regions of the mould. For example, the mould could form a "brick" pattern, with different coloured sand or other material being provided in different "brick" regions; the product formed using this filled mould could have the appearance of a brick wall including bricks of different colours. The surfacing material in different regions could differ as to one or more of material, particle size, particle shape, colour or other property. In other arrangements, the "bricks" might be provided to look substantially all the same, or different effects may be provided.

The particulate or granular material may be applied to the arrangement for pressing as a loose-grained material, or as a block of material, the block being deformed or broken down during the pressing or moulding.

Veneer

Figure 6:
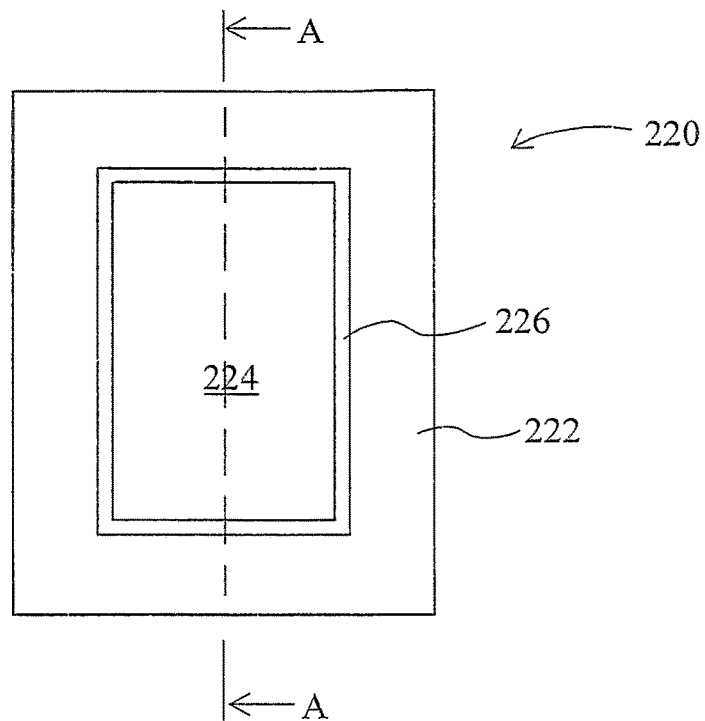
FIG. 6 shows a schematic plan view of a mould used for forming a laminate product according to an example of an aspect of the present invention.

FIG. 6 shows schematically a plan view of an aluminium mould 220. The mould comprises a surface contour suitable for moulding a door panel. The moulding surface is rectangular and includes an outer frame section 222, a rectangular inner panel section 224 and a bead 226 between the panel section 224 and the outer frame 222. The mould is heated to a temperature of approximately 140 degrees C.

Figure 7:
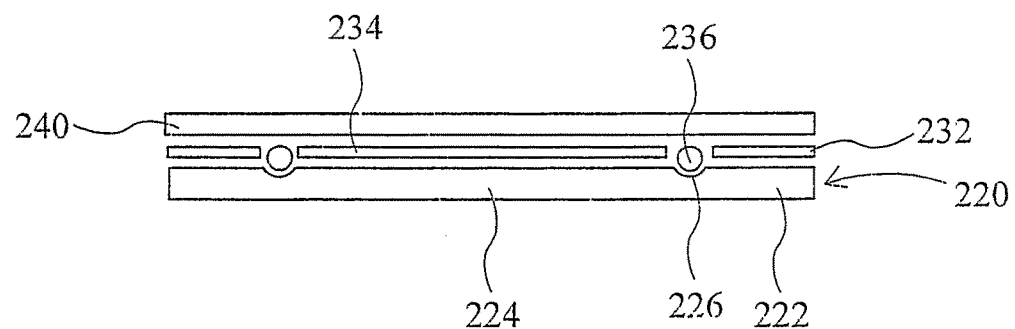
FIG. 7 shows a section taken on A-A of FIG. 6 and showing schematically the veneer and moulding material.

Wood veneer elements are placed in the mould 220 as shown in the sectional view in FIG. 7. In this case, a plurality of veneer elements are used. Frame element 232 is placed onto the outer frame section 222, panel element 234 on the panel section 224 and a bead element 236 in the bead 226 of the mould. Each of the veneer elements may comprise one or more components which may be joined prior to moulding or may be separate.

A sheet of sheet moulding compound 240 is applied to the upper surface of the mould veneer. The sheet 240 is sized so as to extend across the whole area of the mould surface 220.

Figure 8:
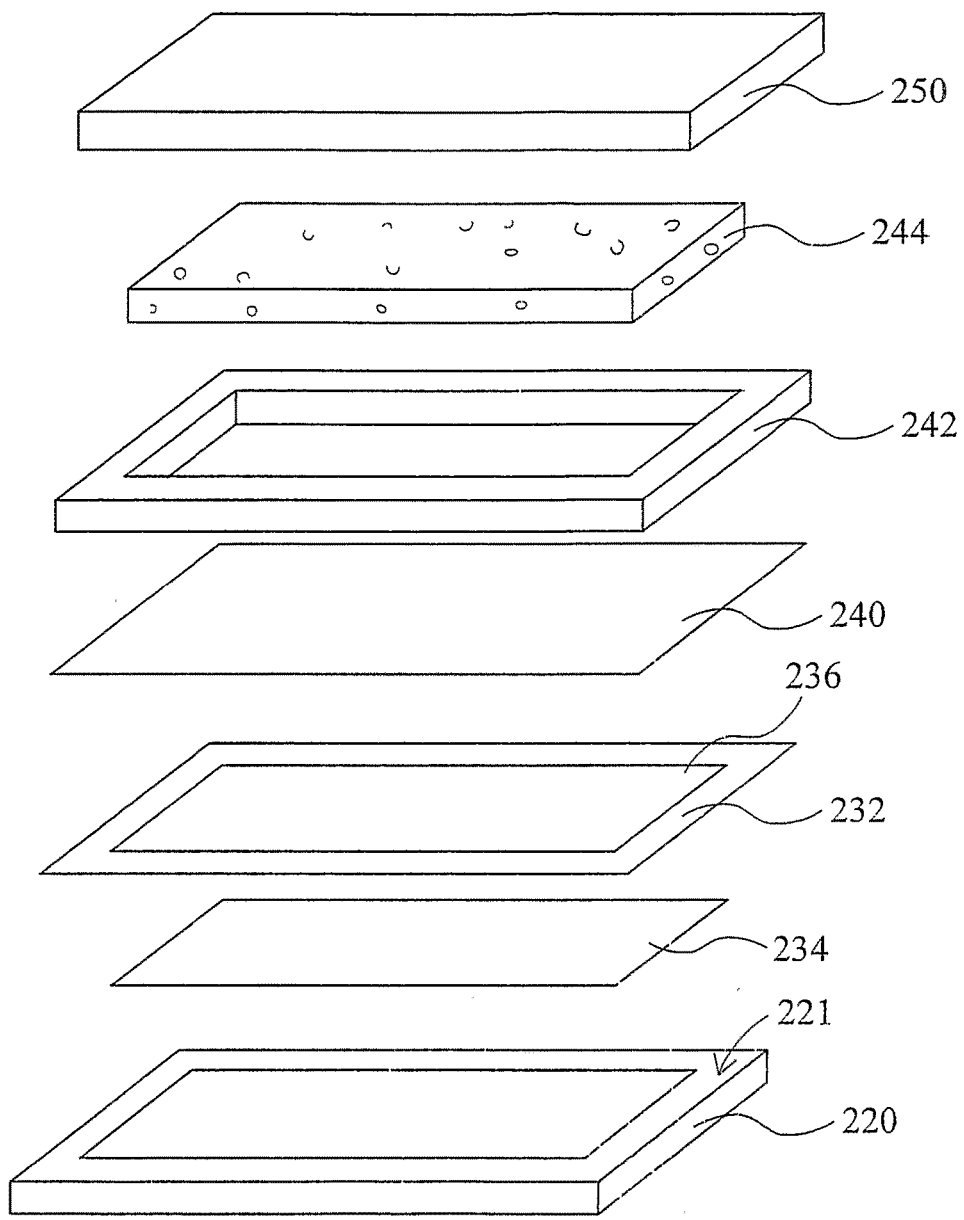
FIG. 8 illustrates in perspective exploded view the moulding of a laminated composite.

Further elements for forming the laminate are shown in FIG. 8. It will be appreciated that in FIG. 8 and in other of the figures the shapes of the components are shown schematically. In particular, the relative thicknesses of the elements are not shown to scale. For example, the preferred thickness of veneers is about 3 mm.

Onto the sheet 240 is placed a wooden frame 242 is positioned onto the sheet 240 (FIG. 8) and a block of foam substrate 244 is inserted into the frame 242.

The substrate 244 may comprise a foam, for example as described in more detail below.

Such foam used is advantageously:
structural and has significant load bearing properties
frangible and can be formed under pressure and has no memory and therefore substantially retains its pressed form
open cell and therefore allows the migration of clues resins into the cells during door manufacture to create a truly monolithic composite structure.

In an example of the foam used, the cell size ranges from 0.5 to 3 mm and the density is 80 to 800 kg/m3.

The block of foam 244 is sized so as to be thicker than the frame so that the upper surface of the foam 244 extends above the frame 242 when the foam 244 is inserted in the aperture of the frame 242.

Downward pressure of about 100 tonnes is applied to the components (as arranged in FIG. 8) using a pressure plate 250. The substrate 244 is pressed toward the lower moulding surface 220, crushing the foam and moulding the lower surface of the substrate to the shape of the mould surface 220. The SMC sheet 240 is also pressed between the veneer 232, 234, 236 and the substrate 244. Near the heated mould surface 220, the SMC begins to liquefy and flow into cells at the surface of the substrate 244 as well as into pores and other spaces at the surface of the veneers 232, 234, 236.

Air and other gases trapped between the SMC 240 and the substrate 244 passes through the open cell structure of the foam. The components are held in the mould with the application of pressure for a sufficient time for the SMC to cure for form a skin bound to the moulded substrate 244 and the veneer 232, 234, 236.

The resulting product is removed from the mould. The cycle time for moulding the product may be about 4 minutes.

It is seen that in this example, an upper mould portion is not required. In this example, the components are pressed against a single heated platen.

Figure 9:
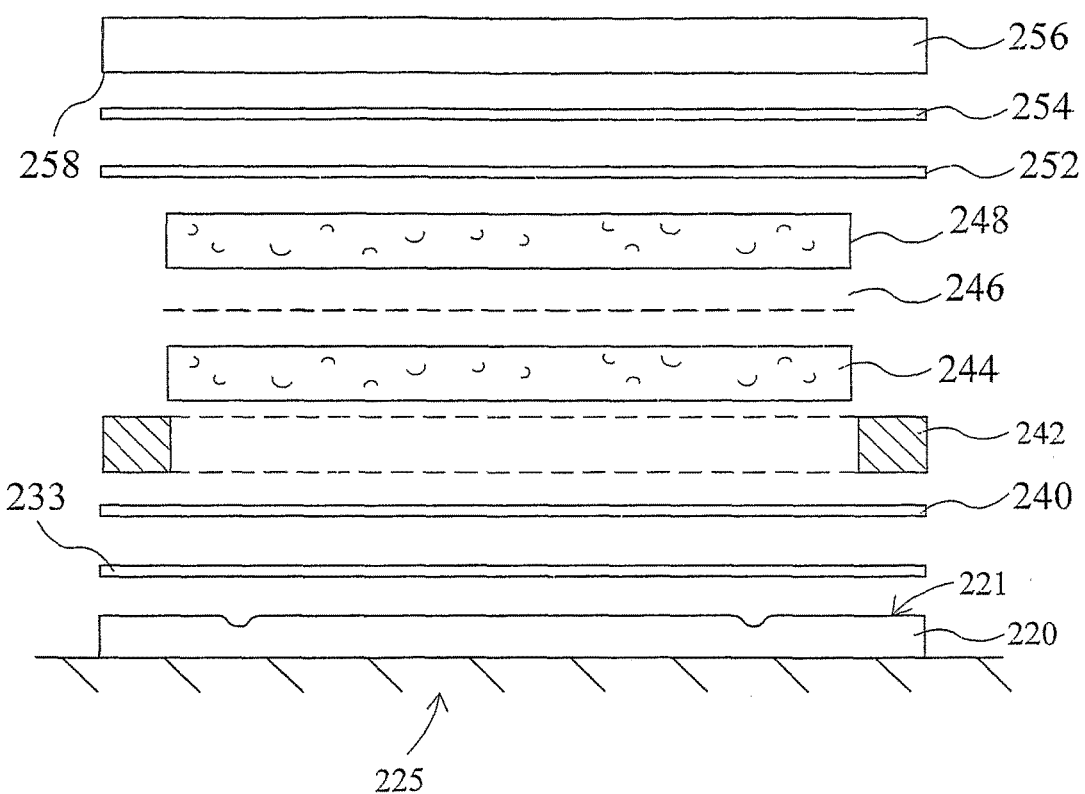
FIG. 9 shows in schematic sectional view the components of a door.

Referring now to FIG. 9, a method is described in which a moulded door having a veneer surface is formed in a single pressing step.

A lower mould 220 is provided and placed on a heated platen 225 so that the mould reaches a temperature of about 140 degrees C. The lower moulding surface 221 of the lower mould 220 may be flat or may be contoured as here according to the surface shape of a paneled door.

A layer of veneer 233 is placed onto the moulding surface 221. The veneer layer 233 may include more than one element, for example as shown in FIG. 7. The veneer elements comprise for example thin portions of oak wood.

A lower sheet 240 of curable material is applied to the veneer. The size of the lower sheet 240 is approximately the same as that of the lower moulding surface 221.

A foam block 244 comprising ACELL foam is applied to the upper surface of the lower sheet 240. A wooden frame 242 is placed around the lower foam block. Alternatively, the frame 242 could be applied first, and the block 244 inserted into the frame. A reinforcement sheet 246 comprising a metal grid is placed in the frame 242 onto the lower foam block 244. Onto the reinforcement sheet 246 and within the frame 242 is placed an upper foam block 248 also comprising ACELL foam. A layer of adhesive may be applied between the two blocks 244, 248 to aid bonding. Onto the upper foam block is placed the upper sheet 252 of curable material.

Optionally, onto the upper sheet of curable material 252 is placed further veneer elements 254. In some arrangements, it will be desired for the veneer to be present on both surfaces of the panel. In other arrangements, veneer on one surface of the door only will be required. In the latter case, it will be appreciated that the veneer may be arranged at the lower or the upper region of the moulded components.

An upper mould 256 is provided having an upper moulding surface 258 contoured according to the surface shape of a paneled door or flat as shown here. The upper mould 256 is heated to a temperature of about 140 degrees C.

The upper mould 256 is lowered onto the other components and pressure of about 100 tonnes is applied to press the upper mould 256 towards the lower mould 220.

The upper block 248 and the lower block 244 comprise frangible foam and the surfaces of the blocks facing the adjacent mould surfaces 220 and 258 are crushed and moulded to the surface shape of the paneled door.

The curable material of the upper and lower sheets 240 and 252 flow into the adjacent foam blocks 244, 248 and also into the veneers 233, 254 to form a mechanical bond. Curing of the curable material takes place in the heated mould so that the upper and lower sheets 240 and 252 form skins bonded to the upper and lower blocks.

Once cure is complete after a few minutes, the formed door is released from the mould.

Thus it can be seen how a door can be made in a single pressing operation.

In an alternative example, the lower block 244, the reinforcement 246 and the upper block 248 are provided as a single unit.

In other arrangements, the mould may be coated with a powder coating which then forms a coating on the product. This feature may be present in relation to any of the aspects of the invention. As an example, a powder coating can be applied electrostatically to the mould surface. Where the mould surface is heated, the powder coating melts or softens almost as soon as it is applied to the surface. For example the powder may include a polyester. The SMC or other matrix material (with or without integral reinforcing material) is then applied over the melted or softened powder coating. The melted or softened powder coating is then "sticky" on the surface of the mould and is thought to reduce movement of the matrix material during the moulding operation, which can in some cases give improved surface finish. In this example, the coating remains on the surface of the product, and provides a surface which is scratch and/or impact resistant. The powder coating can be coloured and thus provide a coloured coating to the product. The powder coating may be transparent or translucent and may have the appearance of a varnish on the surface of the product.

It will be understood that a very wide range of different composite products could be formed using methods as described herein. The application of the present invention is not restricted to the formation of, for example, doors.

Simulated Surface Effect

In a method described in UK Patent Application No. 0719343.6, the skins are bonded directly to a foam core during a moulding step. A layer of sheet-form SMC is provided on the mould surface, a foam core is placed on the layer of SMC, and pressure is applied to mould the components together. During the moulding step, the core and SMC layer are moulded to the desired shape, and the SMC material becomes bonded to the core. The content of that patent application is incorporated herein by reference.

Figure 10:
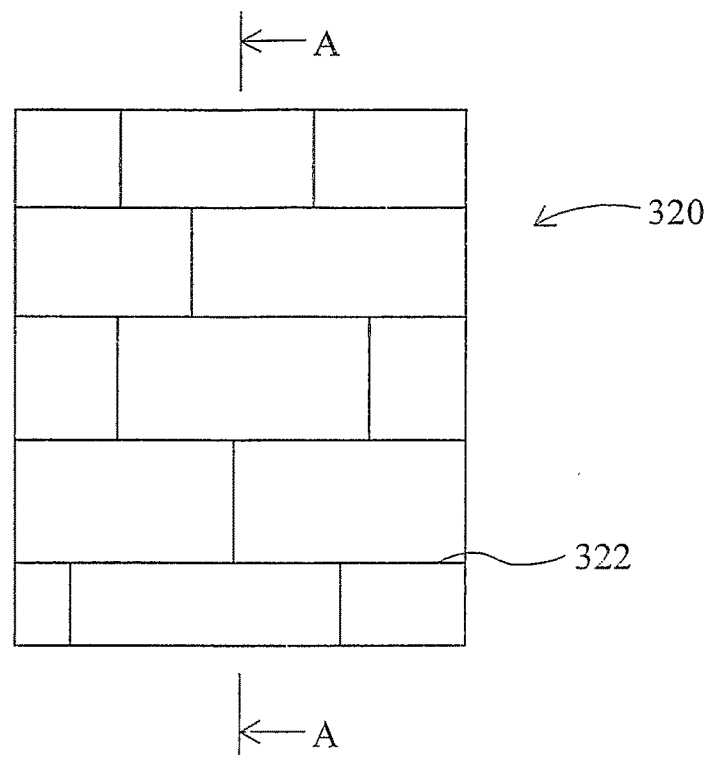
FIG. 10 shows a schematic plan view of a mould used for forming a skin according to an example of an aspect of the present invention.

FIG. 10 shows schematically a plan view of an aluminium mould 320. The mould comprises a surface contour suitable for moulding a simulated stone panel. The moulding surface is rectangular and includes a pattern of projections 322 arranged to emulate the position of gaps between adjacent blocks of a stone wall.

The mould is heated to a temperature of approximately 140 degrees C.

Graphite powder is dusted over the surface of the mould to form a surface effect layer 330.

Figure 11:
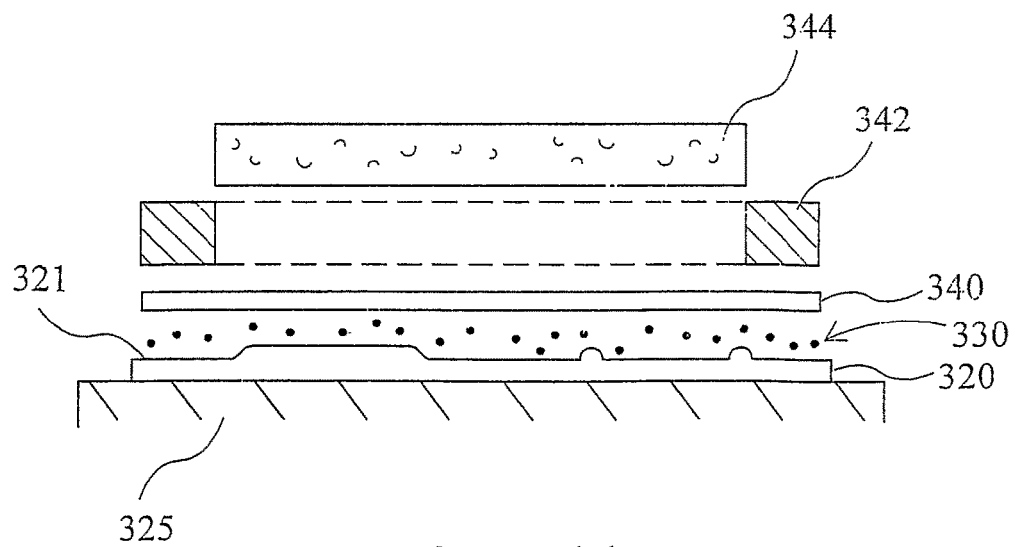
FIG. 11 shows a section taken on A-A of FIG. 10 and showing schematically the components for moulding a laminate product including the simulated effect surface.

As shown in FIG. 11, a sheet of sheet moulding compound 340 is applied to the upper surface of the mould over the surface effect layer 330. The sheet 340 is sized so as to extend across the whole area of the mould surface 320.

It will be appreciated that in FIG. 11 and in other of the figures the shapes of the components are shown schematically. In particular, the relative thicknesses of the elements are not shown to scale. For example, the preferred thickness of the SMC is about 1 mm whereas the thickness of the substrate is about 5 cm.

Onto the sheet 340 is placed a wooden frame 342 is positioned onto the sheet 340 (FIG. 11) and a block of foam substrate 344 is inserted into the frame 342.

The substrate 344 may comprise a foam, for example as described in more detail below.

Such foam used is advantageously:

structural and has significant load bearing properties frangible and can be formed under pressure and has no memory and therefore substantially retains its pressed form open cell and therefore allows the migration of clues resins into the cells during door manufacture to create a truly monolithic composite structure.

In an example of the foam used, the cell size ranges from 0.5 to 3 mm and the density is 80 to 800 kg/m3.

The block of foam 344 is sized so as to be thicker than the frame so that the upper surface of the foam 344 extends above the frame 342 when the foam 344 is inserted in the aperture of the frame 342.

Figure 12:
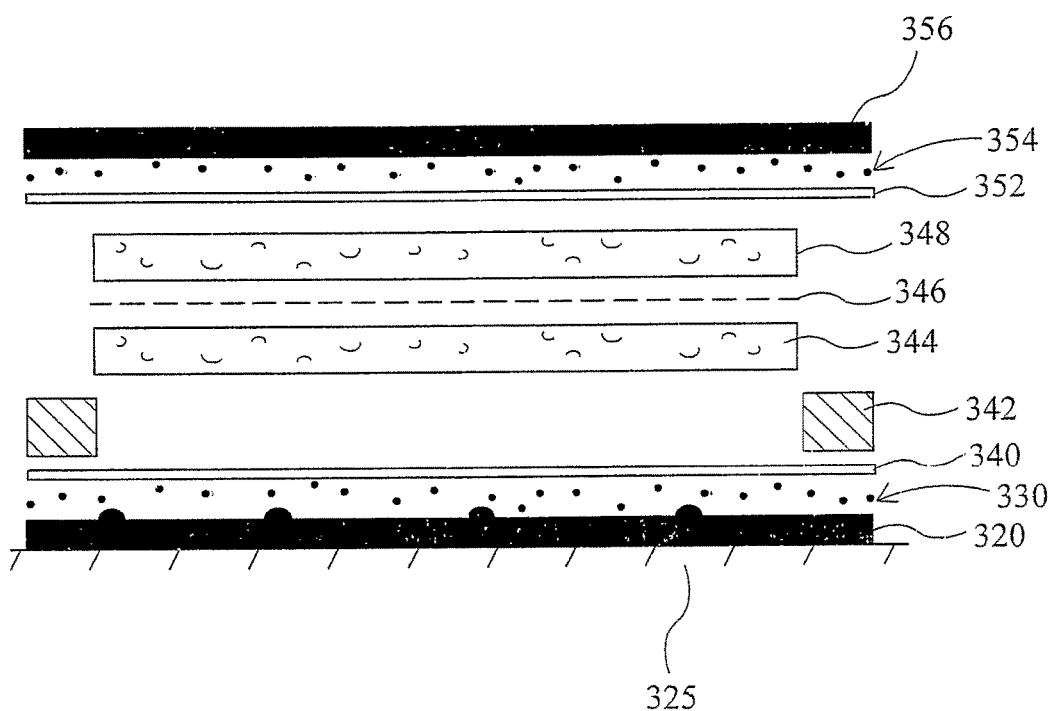
FIG. 12 shows the layers in a method for moulding a wall panel having a cool touch surface.

Downward pressure of about 100 tonnes is applied to the components (as arranged in FIG. 12) using a pressure plate 350. The substrate 344 is pressed toward the lower moulding surface 320, crushing the foam and moulding the lower surface of the substrate to the shape of the mould surface 320. The SMC sheet 340 is also pressed between the mould surface and the substrate 344. Near the heated mould surface 320, the SMC begins to liquefy and flows into cells at the surface of the substrate 344 as well as around the graphite powder to encapsulate the graphite into its surface.

Air and other gases trapped between the SMC 340 and the substrate 344 passes through the open cell structure of the foam. The components are held in the mould with the application of pressure for a sufficient time for the SMC to cure for form a skin bound to the moulded substrate 344.

The resulting product is removed from the mould. The cycle time for moulding the product may be about 4 minutes.

It is seen that in this example, an upper mould portion is not required. In this example, the components are pressed against a single heated platen.

A moulded panel having a stone-effect surface may be formed in a single pressing step.

A lower mould 320 is provided and placed on a heated platen 325 so that the mould reaches a temperature of about 140 degrees C. The lower moulding surface 321 of the lower mould 320 may be flat or may be contoured as here according to the surface shape of a stone wall.

A layer of surface effect material 330, here graphite is placed onto the moulding surface 321.

A sheet 340 of curable material is applied. The size of the lower sheet 340 is approximately the same as that of the lower moulding surface 321.

A foam block 344 comprising ACELL foam is applied to the upper surface of the lower sheet 340. A wooden frame 342 is placed around the lower foam block. Alternatively, the frame 342 could be applied first, and the block 344 inserted into the frame. A reinforcement sheet 346 comprising a metal grid is placed in the frame 342 onto the lower foam block 344. Onto the reinforcement sheet 346 and within the frame 342 is placed an upper foam block 348 also comprising ACELL foam. A layer of adhesive may be applied between the two blocks 344, 348 to aid bonding. Onto the upper foam block is placed the upper sheet 352 of curable material.

Optionally, onto the upper sheet of curable material 352 is placed further surface effect material, for example graphite 354. In some arrangements, it will be desired for the cool touch surface to be present on both surfaces of the panel. In other arrangements, a cool touch surface on one surface of the panel only will be required. In the latter case, it will be appreciated that the surface effect material may be arranged at the lower or the upper region of the moulded components. In other words, the order of laying down of the components shown in FIG. 12 may be reversed.

An upper mould 356 is provided having an upper moulding surface 358 contoured according to the surface shape of a wall panel or flat as shown here. The upper mould 356 is heated to a temperature of about 140 degrees C.

The upper mould 356 is lowered onto the other components and pressure of about 100 tonnes is applied to press the upper mould 356 towards the lower mould 320.

The upper block 348 and the lower block 344 comprise frangible foam and the surfaces of the blocks facing the adjacent mould surfaces 320 and 358 are crushed and moulded to the surface shape of the wall panel.

The curable material of the upper and lower sheets 340 and 352 flow into the adjacent foam blocks 344, 348 and also around the graphite particles to form a mechanical bond. Curing of the curable material takes place in the heated mould so that the upper and lower sheets 340 and 352 form skins bonded to the upper and lower blocks.

Once cure is complete after a few minutes, the formed panel is released from the mould.

Thus it can be seen how a panel can be made in a single pressing operation.

In an alternative example, the lower block 344, the reinforcement 346 and the upper block 348 are provided as a single unit.

In some arrangements, the mould may be coated with a powder coating which then forms a coating on the product. This feature may be present in relation to any of the aspects of the invention. As an example, a powder coating can be applied electrostatically to the mould surface. Where the mould surface is heated, the powder coating melts or softens almost as soon as it is applied to the surface. For example the powder may include a polyester. The SMC or other matrix material (with or without integral reinforcing material) is then applied over the melted or softened powder coating. The melted or softened powder coating is then "sticky" on the surface of the mould and is thought to reduce movement of the matrix material during the moulding operation, which can in some cases give improved surface finish. In this example, the coating remains on the surface of the product, and provides a surface which is scratch and/or impact resistant. The powder coating can be coloured and thus provide a coloured coating to the product. The powder coating may be transparent or translucent and may have the appearance of a varnish on the surface of the product.

It will be understood that a very wide range of different composite products could be formed using methods as described herein. The application of the present invention is not restricted to the formation of, for example, panels.

Example of Preparation of SMC

The SMC comprises a curable matrix and reinforcement.

To prepare the SMC, the matrix is prepared by mixing, for example a polyester resin with minerals and additives, for example including calcium carbonate and titanium dioxide together with appropriate pigments.

For example, in the case where the SMC is used in the preparation of a simulated sandstone surface, pigments or other materials may be added to the composition to give it a beige colour when cured.

The matrix in the form of the resin paste is then applied to a bottom film carrier. Glass fibres as the reinforcement are then applied to the upper surface of the resin paste on the film carrier. A further layer of the resin paste is applied to sandwich the fibres between the layers of matrix. A top film is applied to the upper layer of the matrix. The resulting layered composition is subsequently compressed using a series of rollers to form a sheet of the sheet moulding compound between the film carriers. The material is rolled onto rollers and kept for at least 3 days at a regulated temperature of for example 23 to 27 degrees C. The resulting SMC can be compression moulded with heat. The shelf life of the SMC before use is usually a few weeks.

Foam

In some examples of the invention, the substrate comprises a foam having frangible cell walls. Preferably this term includes a foam for which under compression the foam crumbles by brittle fracture of the cell walls e.g. involving a clean fracture of the cell walls. Such a foam can retain a clear and substantially dimensionally accurate imprint in the crushed zone of an object through which the compressive force is applied. In general, it is preferred that the yield strength of the foam, which in this case means the minimum force required to cause the fracture of the cell walls and for the foam to crumble, is in the range of about 100 to 140 KPa (15 to 20 lbs/sq.in) more preferably at least 200 KPa (30 lbs/sq.in), since this provides useful impact resistance. In general, for a given foam composition, the greater the density, the greater the yield strength.

By using a substantially rigid plastics foam with frangible cell walls, mouldings with depressed zones of moulding detail can be readily formed by applying a layer to the foam core with sufficient pressure to cause the cell walls of the foam in the areas behind the depressed zones of the skin to be fractured whereby the foam is caused to conform to the contours of the skin in those zones by controlled localised crushing. Thus, air gaps between the skin and the substrate can be avoided and it is not necessary to pre-form the substrate in the form of complicated shapes. This is particularly advantageous since the presence of such air gaps in prior art products has in some cases contributed to their inability to resist changes in temperature.

For such a method, it is advantageous to use an open cell foam having frangible walls as pressing into a conventional foamed core such as of polystyrene is in some cases not successfully achieved because the resilience of the foam may cause distortion of the skins when the pressure is released.

In some examples of the invention, plastics foam are preferred which are substantially open-cell and rigid. However, the foam is advantageously selected to be of a high density relative to the foamed polystyrene conventionally used, e.g. a density of 75 kg/m$^3$ or above, since this gives a better feel to the panel and makes it sound and handle more like a conventional wooden panel. However, foams having lower densities may also be selected. Where a higher density is desirable, the foam may contain a filler, more preferably a finely divided inert and preferably inorganic solid. The filler may be selected such that it contributes to the panels ability to resist changes in temperature. In a particularly preferred embodiment, the filler is capable of absorbing moisture, e.g. as water of crystallisation.

While particular reference is made in the examples to open celled frangible foams, any suitable foam may be used. In some examples of the invention, foams which are substantially open cell are preferred; for example, a polyurethane foam, but in some examples the foam might not be open celled. Preferably in such example, the structure of the substrate is such that gases can be released from the mould. Where the foam is open celled, a foam that has an open-cell configuration at production is particularly suitable. A foam that also has frangible cell walls is particularly preferred where the panel or other product to be formed has depressed areas, such as to provide a moulding effect. However, as described herein, the moulding of the substrate can be provided by other methods, for example machining.

Any foam can be used some aspects of the invention. In many examples, rigid foam materials are preferred. For example a rigid foam could be used to form a panel having a substantially flat (unmoulded) surface which may or may not include surface pattern as described herein.

Alternatively, or in addition, the surface of the foam may be contoured. The contours could for example be formed on the surface of a foam block, for example by machining or any other suitable method. In such cases, the foam need not for example be a frangible or compressible foam.

Where a foam having frangible cell walls is used, the cell wall will fracture as pressure is placed on the foam by the application of the depressed areas of the mould. This localised increase in pressure will increase the pressure inside the cell, which will cause the gases to travel through the foam, and the cell to collapse thereby accommodating the depressed area of the skin.

One suitable foam is a rigid filled phenolic foam. One particularly suitable foam is that produced by effecting a curing reaction between:

(a) a liquid phenolic resole having a reactivity number (as defined below) of at least 1 and (b) a strong acid hardener for the resole, in the presence of:

(c) a finely divided inert and insoluble particulate solid which is present in an amount of at least 5% by weight of the liquid resole and is substantially uniformly dispersed through the mixture containing resole and hardener; the temperature of the mixture containing resole and hardener due to applied heat not exceeding 85_C. and the said temperature and the concentration of the acid hardener being such that compounds generated as by-products of the curing reaction are volatilised within the mixture before the mixture sets whereby a foamed phenolic resin product is produced.

By a phenolic resole is meant a solution in a suitable solvent of the acid-curable prepolymer composition obtained by condensing, usually in the presence of an alkaline catalyst such as sodium hydroxide, at least one phenolic compound with at least one aldehyde, in well-known manner. Examples of phenols that may be employed are phenol itself and substituted, usually alkyl substituted, derivatives thereof provided that the three positions on the phenolic benzene ring o- and p- to the phenolic hydroxyl group are unsubstituted. Mixtures of such phenols may also be used. Mixtures of one or more than one of such phenols with substituted phenols in which one of the ortho or para positions has been substituted may also be employed where an improvement in the flow characteristics of the resole is required but the cured products will be less highly crosslinked. However, in general, the phenol will be comprised mainly or entirely of phenol itself, for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active H atoms (dihydric compound) that will react with the phenol/aldehyde reaction product of the resole during the curing step to reduce the density of cross-linking. Preferred dihydric compounds are diols, especially alkylene diols or diols in which the chain of atoms between the OH groups contains not only methylene and/or alkyl-substituted methylene groups but also one or more hetero atoms, especially oxygen atoms, e.g. ethylene glycol, propylene glycol, propane-1,3-diol, butane-1,4-diol and neopentyl glycol. Particularly preferred diols are poly-, especially di-, (alkylene ether) diols e.g. diethylene glycol and, especially, dipropylene glycol. Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2-6 atoms between OH groups.

The resole may comprise a solution of the phenol/aldehyde reaction product in water or in any other suitable solvent or in a solvent mixture, which may or may not include water. Where water is used as the sole solvent, it is preferred to be present in an amount of from 15 to 35% by weight of the resole, preferably 20 to 30%. Of course the water content may be substantially less if it is used in conjunction with a cosolvent. e.g. an alcohol or one of the above-mentioned dihydric compounds where one is used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66-67% aqueous solution of p-toluene sulfonic acid at 60 degrees C. The test involves mixing about 5 ml of the resole with the stated amount of the p-toluene sulfonic acid solution in a test tube, immersing the test tube in a water bath heated to 60 degrees C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable. The preferred hardeners for the process of the invention are the aromatic sulfonic acids, especially toluene sulfonic acids.

The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5-20 poises. Below 5 Poises, the amount of solvent present tends to present difficulties during the curing reaction.

The curing reaction is exothermic and will therefore of itself cause the temperature of the mixture containing resole and acid hardener to be raised. The temperature of the mixture may also be raised by applied heat but the temperature to which said mixture may then be raised (that is, excluding the effect of any exotherm) must not exceed 85 degrees C.

If the temperature of the mixture exceeds 85 degrees C. before addition of the hardener, it is difficult or impossible thereafter to properly disperse the hardener through the mixture because of incipient curing. On the other hand, it is difficult, if not impossible, to uniformly heat the mixture above 85 degrees C. after addition of the hardener.

Increasing the temperature towards 85 degrees C. tends to lead to coarseness and non-uniformity of the texture of the foam but this can be offset at least to some extent at moderate temperatures by reducing the concentration of hardener. However at temperatures much above 75 degrees C. even the minimum amount of hardener required to cause the composition to set is generally too much to avoid these disadvantages. Thus, temperatures above 75 degrees C. are preferably avoided and preferred temperatures for most applications are from ambient temperature to about 75 degrees C. The preferred temperature range appears to depend to some extent on the nature of the solid (c). For most solids it is from 25 to 65 degrees C. but for some solids, in particular wood flour and grain flour, the preferred range is 25 to 75 degrees C. The most preferred temperature range is 30 to 50 degrees C. Temperatures below ambient, e.g. down to 10 degrees C. can be used, if desired, but no advantage is gained thereby. In general, at temperatures up to 75 degrees C., increase in temperature leads to decrease in the density of the foam and vice versa.

The amount of hardener present also affects the nature of the product as well as the rate of hardening. Thus, increasing the amount of hardener not only has the effect of reducing the time required to harden the composition but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of chosen hardener required to give substantially the same setting time as the stated amount of p-toluene sulfonic acid. The most suitable amount for any given temperature and combination of resole and finely divided solid is readily determinable by simple experiment. Where the preferred temperature range is 25-75 degrees C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25 degrees C. or resoles having a reactivity number below 10, it may be necessary to use more hardener.

It may be necessary to make some adjustment of the hardener composition in accordance with the nature, especially shape and size, of the mould and this can be established by experiment.

By suitable control of the temperature and of the hardener concentration, the time lapse between adding the hardener to the resole and the composition becoming hard (referred to herein as the setting time) can be varied at will from a few seconds to up to an hour or even more, without substantially affecting the density and cell structure of the product.

Another factor that controls the amount of hardener required can be the nature of the inert solid. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily $CH_2O$ and/or $H_2O$, present in the resole and/or generated by the curing action, and provides sites at which bubble formation is promoted, thereby assisting uniformity of pore size. The presence of the finely divided solid may also promote stabilization of the individual bubbles and reduce the tendency of bubbles to agglomerate and eventually cause likelihood of bubble collapse prior to cure. The phenomenon may be similar to that of froth flotation employed in the concentration of low grade ores in metallurgy. In any event, the presence of the solid is essential to the formation of the product. To achieve the desired effect, the solid should be present in an amount of not less than 5% by weight based on the weight of the resole.

Any finely divided particulate solid that is insoluble in the reaction mixture is suitable, provided it is inert. The fillers may be organic or inorganic (including metallic), and crystalline or amorphous. Even fibrous solids have been found to be effective, although not preferred. Examples include clays, clay minerals, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is the hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and fly ash. The preferred amounts of these solids are also 20 to 200 parts by weight per 100 parts by weight of resole.

For the above classes of solid, the most preferred range is 50 to 150 parts per 100 parts of resole.

Thixotropic foam-forming mixtures can be obtained if a very finely divided solid such as Aerosil (finely divided silica) is included.

If a finely divided metal powder is included, electrically conducting properties can be obtained. The metal powder is preferably used in amounts of from 50 to 250 parts per 100 parts by weight of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

In general, it is preferred to use the fibrous solids only in conjunction with a non-fibrous solid since otherwise the foam texture tends to be poorer.

Other additives may be included in the foam-forming mixture; e.g. surfactants, such as anionic materials e.g. sodium salts of long chain alkyl benzene sulfonic acids, non-ionic materials such as those based on poly(ethylene oxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols.

Polymerisable unsaturated compounds may also be included possibly together with free-radical polymerisation initiators that are activated during the curing action e.g. acrylic monomers, so-called urethane acrylates, styrene, maleic acid and derivatives thereof, and mixtures thereof.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc.

Conventional blowing agents may also be included to enhance the foaming reaction, e.g. low boiling organic compounds or compounds which decompose or react to produce gases.

The foam-forming compositions may also contain dehydrators, if desired.

A preferred method of forming the foam-forming composition comprises first mixing the resole and inert filler to obtain a substantially uniform dispersion of the filler in the resole, and thereafter adding the hardener. Uniform distribution of both the filler and the hardener throughout the composition is essential for the production of uniformly textured foam products and therefore thorough mixing is required.

If it is desired that the composition is at elevated temperature prior to commencement of the exothermic reaction, this can be achieved by heating the resole or first mixing the resole and the solid and then heating the mixture. Preferably the solid is added to the resole just before the addition of the hardener. Alternatively, the mixture of resole, solid and hardener may be prepared and the whole mixture then heated, e.g. by short wave irradiation, preferably after it has been charged to a mould. A conventional radiant heat oven may also be used, if desired, but it is difficult to achieve uniform heating of the mixture by this means.

Preferably, the foam has a density in the range 75 to 500 kg/m$^3$, more preferably 100 to 400 kg/m$^3$ and most preferably 100 to 250 kg/m$^3$. Foam cell size is also important because up to a limit the larger the size of the cell for a given density, the thicker will be the walls and hence the greater the physical strength of the foam. However if the cell size is too large, the strength begins to suffer. Preferably, the cell size is in the range of 1 to 3 mm.

It will be understood that the present invention has been described above purely by way of example, and modification of detail can be made within the scope of the invention.

In particular, the examples above have been described in relation to the manufacture of panels. However, it should be appreciated that the invention has very wide application including other products. Indeed it is envisaged that an extremely wide range of products could be made in accordance with methods of the present invention. Many moulded products could be made using the methods of the present invention, even where those products may currently be manufactured using different materials (for example wood, stone, metal, porcelain) at present. For example, the techniques of the present invention could be used to form, for example mullioned windows, pillars, baluster, banister, or even statues or other ornamental articles. In addition to building products, it is envisaged that for example, the invention could find application to vehicle parts and fittings, casings for electrical equipment and many household items of which furniture, picture frames, chairs, tables, lamp bases, vases, bowls are only a few examples.

While particular reference has been made to the simulation of stone surfaces, features of the invention may be used in the preparation of other surfaces, for example brick-effect surfaces or any other surface effect where a granular surface is desirable.

Figure 4A:
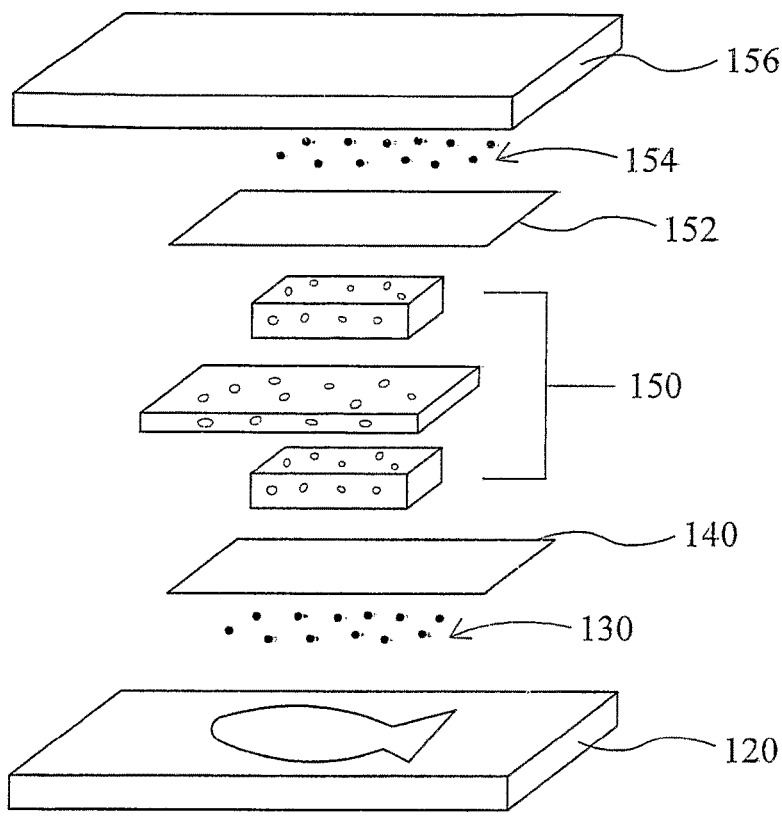
FIGS. 4a and 4b show steps in forming three dimensional article using a method of the present invention.
Figure 4B:
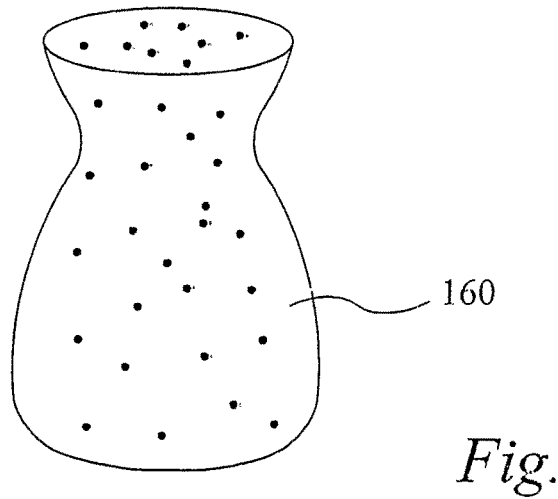

FIGS. 4a and 4b shows an example where the techniques described above are used to form an three dimensional decorative article having a stone-effect surface.

FIG. 4a shows the components for moulding the article in a single moulding step. A lower mould 120 for the article is heated and a granular layer of sharp sand 130 is dusted onto the mould. A coating may be applied to the mould to allow the sand to stick to the mould surface without slipping to the lowest point of the mould. For example, the coating may include an adhesive sprayed onto the mould surface.

SMC sheet 140 is applied to the mould cavity and a plurality of blocks 150 of open cell foam are inserted into the mould. Adhesive may be applied to bond the blocks together. Alternatively, or in addition shaped blocks of foam may be used.

A second layer of SMC 152 is applied over the blocks 150, and a further layer of granular material, for example sand 154 is applied to the SMC layer, and/or to the upper mould 156. Adhesive may be applied to the SMC layer 152 and/or the mould 156 to aid the adhesion of the sand where required.

The mould pieces are then brought together under pressure to compress the components and to cure the SMC.

The resulting article 160 is taken from the mould when the moulding process is complete. A sandblasting step removes some of the cured SMC material from the surface of the article 160, exposing the sand grains and providing a simulated stone surface on the article.

In summary, aspects of the present invention relate to methods of manufacturing composite products having a surface effect. In some examples described, a composite product has a simulated surface, for example a stone-effect surface formed by pressing a particulate-form surface material and a sheet-form curable material onto a substrate having an open-celled structure. In other examples, a laminate product having a veneer is formed by pressing a veneer and a sheet-form material onto a substrate including a porous structure. The veneer may comprise a wood material. In other examples, a surface effect material is bonded to a skin by pressing a sheet-form curable material to a mould surface and the surface effect material. Where the surface effect material has a high thermal conductivity, the composite product formed can feel cool to the touch.

Each feature disclosed in the description, and (where appropriate) the claims and drawings may be provided independently or in any appropriate combination.

Thus it will be appreciated that the various methods described herein could be combined as appropriate to form a particular product. For example, a composite product might have a simulated stone surface in addition to a surface effect applied so that the material feels cool to the touch, and/or a patterned effect. Such effects may all be applied to the same or different surfaces of the product and to the same or different regions of the surface of the product.

The invention claimed is:

1. A method of forming a composite product with a skin having a surface effect, the method comprising:
providing a substrate including a substantially open-celled foam material;
providing a sheet comprising curable material;
providing a surface material in particulate form;
associating the particulate surface material with the sheet comprising curable material;
associating the sheet comprising curable material associated with the particulate surface material with the substrate having a substantially open-celled foam; and
pressing the sheet comprising curable material associated with the particulate surface material and the substrate with a press such that during the pressing the sheet comprising curable material cures and becomes bonded to the substrate and the particulate surface material becomes at least partially embedded in an exposed surface of the sheet comprising curable material.

2. A method according to claim 1, wherein at least a part of the surface material is exposed at the surface of the skin to form a textured surface.

3. A method according to claim 1, wherein the surface effect is applied to a surface effect region of the substrate, and prior to the pressing step the sheet comprising curable material extends substantially continuously across the surface effect region.

4. A method according to claim 1, wherein prior to pressing the sheet comprising curable material extends over substantially all of a surface of the substrate.

5. A method according to claim 1, wherein the surface material includes two different materials, and the step of associating the particulate surface material comprises applying a first surface material in relation to a first region of the substrate and applying a second surface material in relation to a second region of the substrate.

6. A method according to claim 1 wherein the size of the particles of the surface material is such that at least 50% by weight of the particles have a size of at least 0.5 mm.

7. A method according to claim 6, wherein the size of the particles of the surface material is such that at least 70% by weight of the particles have a size of at least 0.5 mm.

8. A method according to claim 6, wherein the size of the particles of the surface material is such that at least 50% by weight of the particles have a size of at least 1.0 mm.

9. A method according to claim 1, wherein the pressing is carried out in a single step to form the composite product.

10. A method according to claim 1, wherein the skin has a simulated stone surface.

11. A method according to claim 1, the method further comprising providing a contoured substrate surface, and pressing the sheet comprising curable material onto the contoured surface.

12. A method according to claim 11, wherein the surfacing material has a dimension that is at least the depth of the contours of the surface, thereby allowing for the press to contact a flat surface when forming the composite product.

13. A method according to claim 1, further comprising a step of carrying out a surface treatment to increase exposure of the particulates in the surface.

14. A method according to claim 1, wherein the particulates include sand.

15. A method according to claim 1, wherein the sheet comprising curable material comprises a sheet molding compound (SMC).

16. A method according to claim 1, wherein the substrate includes surface formations for keying with the curable material.

17. A method according to claim 1, wherein the method further comprises the step of providing a second layer including a sheet comprising curable material over the substrate, the substrate being sandwiched between the first and second layers of sheet comprising curable material, and pressing the second layer and the substrate together.

18. The method of claim 17, further comprising a step of spreading the particulates of surface material across the second layer including a sheet comprising curable material.

19. A method according to claim 1, wherein the substrate comprises a crushable material such that, during the pressing step, a surface of the substrate is molded.

20. A method according to claim 1, wherein the substrate comprises a frangible material.

21. A method according to claim 1 wherein the surface material is heated prior to the pressing step.

22. A method according to claim 1 wherein the method further comprises steps of: arranging a base member and applying a layer of the surface material over the base member; positioning the sheet comprising curable material over the layer of surface material; arranging the substrate over the sheet comprising curable material; and pressing the substrate towards the base member to form the composite product.

23. A method according to claim 1, wherein pressing the sheet comprising curable material associated with the particulate surface material and the substrate against a molding surface and the method further comprises a step of separating the composite product from the molding surface.

* * * * *